United States Patent
Khurana et al.

(10) Patent No.: US 10,339,531 B2
(45) Date of Patent: Jul. 2, 2019

(54) ORGANIC LIGHT EMITTING DIODE ("OLED") SECURITY AUTHENTICATION SYSTEM

(71) Applicant: Bank of America Corporation, Charlotte, NC (US)

(72) Inventors: Rajan Khurana, New Delhi (IN); Monika V. Kapur, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 437 days.

(21) Appl. No.: 15/178,643

(22) Filed: Jun. 10, 2016

(65) Prior Publication Data

US 2017/0357979 A1    Dec. 14, 2017

(51) Int. Cl.
| | | |
|---|---|---|
| *G06K 9/00* | (2006.01) | |
| *G06Q 20/20* | (2012.01) | |
| *G06Q 20/34* | (2012.01) | |
| *G06Q 20/38* | (2012.01) | |
| *G06Q 20/40* | (2012.01) | |
| *H04L 29/06* | (2006.01) | |
| *H04W 12/06* | (2009.01) | |
| *H04W 12/08* | (2009.01) | |
| *G09G 3/3208* | (2016.01) | |

(52) U.S. Cl.
CPC ..... *G06Q 20/4093* (2013.01); *G06K 9/00013* (2013.01); *G06Q 20/20* (2013.01); *G06Q 20/352* (2013.01); *G06Q 20/3829* (2013.01); *G09G 3/3208* (2013.01); *H04L 63/0861* (2013.01); *H04L 63/10* (2013.01); *H04W 12/06* (2013.01); *H04W 12/08* (2013.01); *G09G 2358/00* (2013.01); *G09G 2380/02* (2013.01)

(58) Field of Classification Search
None
See application file for complete search history.

(56) References Cited

U.S. PATENT DOCUMENTS

| | | | |
|---|---|---|---|
| 2,912,066 A | 11/1959 | Ellithorpe | |
| 3,703,864 A | 11/1972 | Bradford | |
| 3,946,206 A | 3/1976 | Darjany | |
| 4,372,225 A | 2/1983 | Tissot et al. | |
| 4,557,352 A | 12/1985 | Tschappat, Jr. | |

(Continued)

FOREIGN PATENT DOCUMENTS

| | | |
|---|---|---|
| DE | 102009028991 | 8/2009 |
| EP | 0827066 | 7/1997 |
| WO | WO2013131153 | 4/2012 |

OTHER PUBLICATIONS

Conor Gaffey, "World's Smallest Nano Chip will Double Processing Power of Smartphones," Jun. 9, 2015.

(Continued)

*Primary Examiner* — Kristy A Haupt
(74) *Attorney, Agent, or Firm* — Weiss & Arons LLP; Michael A. Springs, Esq.

(57) ABSTRACT

Aspects of the invention relate to a smart card that leverages emerging technology hardware to enhance secure release of sensitive data associated with the smart card. The smart card may include an OLED display. The device may include one or more biometric sensors. Embodiments may include pairing a device with a portal used to access sensitive data. When accessing the portal, the user may be required to verify that the device is present before gaining access to the sensitive data.

20 Claims, 17 Drawing Sheets

(56) References Cited

U.S. PATENT DOCUMENTS

| | | |
|---|---|---|
| 4,953,326 A | 9/1990 | Wexler et al. |
| 4,968,873 A | 11/1990 | Dethloff et al. |
| 5,168,354 A | 12/1992 | Martinez et al. |
| 5,313,051 A | 5/1994 | Brigida et al. |
| 5,539,819 A | 7/1996 | Sonoyama et al. |
| 5,693,956 A | 12/1997 | Shi et al. |
| 5,734,154 A | 3/1998 | Jachimowicz et al. |
| 5,770,849 A | 6/1998 | Novis et al. |
| 5,970,888 A | 10/1999 | Sheppard |
| 6,015,092 A | 1/2000 | Postlewaite et al. |
| 6,057,646 A | 5/2000 | Pieroth et al. |
| 6,173,899 B1 | 1/2001 | Rozin |
| 6,394,343 B1 | 5/2002 | Berg et al. |
| 6,724,103 B2 | 4/2004 | Parrault |
| 7,025,277 B2 | 4/2006 | Forrest et al. |
| 7,270,276 B2 | 9/2007 | Vayssiere |
| 7,357,315 B2 | 4/2008 | Vergara et al. |
| 7,360,682 B2 | 4/2008 | Shane et al. |
| 7,360,691 B2 | 4/2008 | Takayama |
| 7,523,856 B2 | 4/2009 | Block et al. |
| 7,588,183 B2 | 9/2009 | Shane et al. |
| 7,791,559 B2 | 9/2010 | Piasecki |
| 7,814,016 B2 | 10/2010 | Pranger |
| 7,856,116 B2 | 12/2010 | Rodriguez et al. |
| 7,940,159 B2 | 5/2011 | Clemens et al. |
| 7,992,789 B2 | 8/2011 | Borracci |
| 8,237,068 B2 | 8/2012 | Szaikowski |
| 8,276,823 B2 | 10/2012 | Chen |
| 8,282,007 B1 | 10/2012 | Cloutier et al. |
| 8,317,094 B2 | 11/2012 | Lehman |
| 8,378,932 B2 | 2/2013 | Fein et al. |
| 8,392,965 B2 | 3/2013 | Carter et al. |
| 8,413,893 B2 | 4/2013 | Kim |
| 8,471,782 B2 | 6/2013 | Muklashy et al. |
| 8,479,981 B2 | 7/2013 | Carmichael et al. |
| 8,399,889 B2 | 9/2013 | Wu et al. |
| 8,523,059 B1 | 9/2013 | Mullen et al. |
| 8,540,151 B1 | 9/2013 | Snyder et al. |
| 8,678,293 B2 | 3/2014 | Chen |
| 8,756,680 B2 | 6/2014 | Shashidhar |
| 8,810,816 B2 | 8/2014 | Fischer et al. |
| 8,820,638 B1 | 9/2014 | Cotter et al. |
| 9,250,657 B2 | 2/2016 | Kim et al. |
| 9,470,404 B2 | 10/2016 | Lee et al. |
| 9,491,879 B2 | 11/2016 | Cheng et al. |
| 9,538,127 B2 | 1/2017 | Gish |
| 9,577,216 B2 | 2/2017 | Fujino et al. |
| 10,056,048 B2 | 8/2018 | Kim |
| 2001/0007332 A1 | 7/2001 | Kjonaas et al. |
| 2003/0145205 A1 | 7/2003 | Sarcanin |
| 2003/0208405 A1 | 11/2003 | Putman et al. |
| 2005/0064936 A1 | 3/2005 | Pryor |
| 2005/0102499 A1 | 5/2005 | Kosuga et al. |
| 2005/0134461 A1 | 6/2005 | Gelbman et al. |
| 2005/0173518 A1 | 8/2005 | Takayama |
| 2005/0263590 A1 | 12/2005 | Branck et al. |
| 2006/0016884 A1 | 1/2006 | Block et al. |
| 2006/0091223 A1 | 5/2006 | Zellner et al. |
| 2006/0131393 A1 | 6/2006 | Cok et al. |
| 2006/0261174 A1 | 11/2006 | Zellner et al. |
| 2006/0289629 A1 | 12/2006 | Smith et al. |
| 2007/0115202 A1 | 5/2007 | Kiesenhofer |
| 2007/0273507 A1 | 11/2007 | Burchell et al. |
| 2007/0279315 A1 | 12/2007 | Laves et al. |
| 2008/0035736 A1 | 2/2008 | Tompkin et al. |
| 2008/0105751 A1 | 5/2008 | Landau |
| 2008/0158150 A1 | 7/2008 | Rossman et al. |
| 2009/0039154 A1 | 2/2009 | Williams et al. |
| 2009/0278452 A1 | 11/2009 | Kim |
| 2009/0314840 A1 | 12/2009 | Granucci et al. |
| 2010/0084476 A1 | 4/2010 | Zellner et al. |
| 2010/0260388 A1 | 10/2010 | Garrett et al. |
| 2010/0302206 A1 | 12/2010 | Yu et al. |
| 2011/0058113 A1 | 3/2011 | Threlkel et al. |
| 2011/0060640 A1 | 3/2011 | Thompson et al. |
| 2011/0140841 A1 | 6/2011 | Bona et al. |
| 2011/0148944 A1 | 6/2011 | Kobayashi |
| 2011/0164047 A1 | 7/2011 | Pance |
| 2011/0178928 A1 | 7/2011 | Carmichael et al. |
| 2011/0241996 A1 | 10/2011 | Vesely |
| 2012/0019434 A1 | 1/2012 | Kuhlman et al. |
| 2012/0280924 A1 | 11/2012 | Kummer et al. |
| 2013/0162594 A1 | 6/2013 | Paulsen et al. |
| 2013/0221112 A1 | 8/2013 | Lai et al. |
| 2013/0232082 A1 | 9/2013 | Krawczewicz et al. |
| 2013/0341394 A1 | 12/2013 | Seo et al. |
| 2014/0007002 A1 | 1/2014 | Chang et al. |
| 2014/0081729 A1 | 3/2014 | Ocher |
| 2014/0093144 A1 | 4/2014 | Feekes |
| 2014/0114861 A1 | 4/2014 | Mages et al. |
| 2014/0118415 A1 | 5/2014 | Seo |
| 2014/0172700 A1 | 6/2014 | Teuwen et al. |
| 2014/0226275 A1 | 8/2014 | Ko et al. |
| 2014/0267960 A1 | 9/2014 | Ward |
| 2014/0291406 A1 | 10/2014 | Ko |
| 2014/0337957 A1 | 11/2014 | Feekes |
| 2014/0339315 A1 | 11/2014 | Ko |
| 2014/0353384 A1 | 12/2014 | Hoegerl et al. |
| 2014/0374494 A1 | 12/2014 | Seo |
| 2015/0069126 A1 | 3/2015 | Leon |
| 2015/0077646 A1 | 3/2015 | Chen et al. |
| 2015/0179025 A1 | 6/2015 | Cowell |
| 2015/0262052 A1 | 9/2015 | Pahuja |
| 2016/0004945 A1 | 1/2016 | Wade |
| 2016/0027391 A1 | 1/2016 | Gibson et al. |
| 2016/0054479 A1 | 2/2016 | Ho et al. |
| 2016/0085325 A1 | 3/2016 | Lee et al. |
| 2016/0098709 A1 | 4/2016 | Johnson et al. |
| 2016/0171461 A1 | 6/2016 | Hoover et al. |
| 2016/0210453 A1 | 7/2016 | Seo et al. |
| 2016/0224528 A1 | 8/2016 | Trevarthen et al. |
| 2016/0254336 A1 | 9/2016 | Zhang et al. |
| 2016/0307089 A1 | 10/2016 | Wurmfeld et al. |
| 2017/0103718 A1 | 4/2017 | Miller |
| 2017/0357979 A1 | 12/2017 | Khurana et al. |

OTHER PUBLICATIONS http://www.us.schott.com/innovation/ultrathinglass/, Retrieved on Sep. 14, 2016.
"Schott's Reliable and Strong Ultra-Thin Glass Features in Fingerprint Sensors in new Smartphones," Retrieved on Sep. 14, 2016.
Ron Martens, "The OLED Handbook, A Guide to OLED Technology, Industry & Market," 2015 Edition.
Bryce Kellogg, Vamsi Talla, Shyamnath Gollakota and Joshua R. Smith, "Passive Wi-Fi: Bringing Low Power to Wi-Fi Transmissions," Retrieved on May 11, 2016.
Ron Mertens, SecureCard—A New Secure Credit Card Technology, Utilizing an OLED Display, Nov. 21, 2006, Metalgrass Software.
John Wehr, "Card Size Specifications: When Does Card Size Matter?" Jan. 1, 2002.
Zachary Shahan, "Ultra-Thin-Solar-Cell Company Unstealths, Aims to Cut Cost of Solar Cells in Half!" Mar. 14, 2012, Sustainable Enterprises Media, Inc.
"ISO Magnetic Stripe Card Standards," Retrieved on Jul. 18, 2016.
"Coin Vs. Plastic: Which Credit Card Consolidation Tool is the Best?" Retrieved on Apr. 7, 2016, PayProTec.
"Tiny Batteries Could Revolutionize Green Energy," Retrieved on Apr. 5, 2016, National Geographic Society.
"Yubikey 4 & Yubikey 4 Nano," Retrieved on Apr. 7, 2016, Yubico.
"Magnetic Stripe Card Standards," Retrieved on Apr. 20, 2016, MagTek Inc., Seal Beach, California.
"A Power-Harvesting Pad-Less mm-sized 24/60GHz Passive Radio With On-Chip Antennas," Retrieved on Apr. 19, 2016, IEEE.
"Magnetic Stripe Card Recommendations," Retrieved on Apr. 20, 2016.
"Plastic Card Manufacturing Including Magnetic Stripe Tapelaying," Retrieved on Apr. 20, 2016.
Paul Buckley, "Flexible OLED Displays Target Volume Production in 2015," Feb. 5, 2015.

(56) References Cited

OTHER PUBLICATIONS

"MAX2837—2.3GHz to 2.7GHz Wireless Broadband RF Transceiver," Retrieved on May 30, 2016, Maxim Integrated.
"Ultrathin Rechargeable Lithium Polymer Batteries from PowerStream," Apr. 5, 2016, Lund Instrument Engineering, Inc.
Tom Abate, "Stanford Engineers Aim to Connect the World with Ant-Sized Radios," Sep. 9, 2014, Stanford University, Stanford California.
http://www.schott.com/advanced_optics/english/syn/advanced_optics/products/wafers-and-thin-glass/glass-wafer-and-substrates/ultra-thin-glass/index.html, Retrieved on May 30, 2016.
Jennifer Langston, "UW Engineers Achieve Wi-Fi at 10,000 Times Lower Power," Feb. 23, 2016.
Ron Mertens, "New All-In-One Credit Card Concept," Oct. 29, 2009, Metalgrass Software.
"Wi-Fi," Apr. 12, 2016, Wikimedia Foundation, Inc.
"Ant-Sized IoT Radio," Retrieved on Jul. 18, 2016.
Nick Pino, "Samsung's Latest OLED Can be a Mirror, a Window, or a TV," Jun. 11, 2015, Future US, Inc., San Francisco, California.
"Pneumatic Tube," Mar. 11, 2016, Wikimedia Foundation, Inc.
"New Virtual Tellers," Retrieved on Jun. 6, 2016, Frontier Bank.
Dario Borghino, "High-Tech Light Shutter Could Help Turn Your Windows into LCD Displays," May 1, 2015, Gizmag.
L. Zhao et al. "Novel Method for Fabricating Flexible Active Matrix Organic Light Emitting Diode (AMOLED) Displays," Sep. 21, 2011, Hewlett-Packard Development Company, L.P.
Amar Toor, "LG Unveils Flexible Plastic E-paper Display, Aims for European Launch Next Month," Mar. 29, 2012.
Martyn Williams, "Samsung, LG Show Flexible OLED, E-Paper Screens," Nov. 10, 2010.
"Electronic Paper," Jun. 10, 2016, Wikimedia Foundation, Inc.
"E Ink," Jun. 8, 2016, Wikimedia Foundation, Inc.
"Ink Technology: Electrophoretic Ink, Explained," Retrieved on Jun. 20, 2016, E Ink Holdings, Inc.
"Are Toeprints Unique, Like Fingerprints?" Retrieved on Jun. 23, 2016.
Sampath Srinivas, Dirk Balfanz, Eric Tiffany, Alexi Czeskis, "Univeral $2^{nd}$ Factor (U2F) Overview", May 14, 2016, FIDO Alliance.
"Sonavation Announces Fingerprint Imaging Through Smart Phone OLED Display," Feb. 22, 2016.
Dario Borghino, "Wearable Thermoelectric Generator Could Extend Your Smartwatch's Battery Life", Apr. 14, 2014, Gizmag.
"Inductive Charging", May 6, 2016, Wikimedia Foundation, Inc.
"Near Field Communication", Apr. 29, 2016, Wikimedia Foundation, Inc.
Sumi Das, "A Keyboard that Rises Up From Flat Touch Screens," Feb. 13, 2013.
Jessica Leber, "A Shape-Shifting Smartphone Touch Screen," Dec. 3, 2012.
Matthew Frankel, "Could This Be the Bank of the Future?" Nov. 9, 2014.
"Contactless Payment," Jul. 27, 2016, Wikimedia Foundation, Inc.
Zhiquin Chen, "Java Card Technology for Smart Cards: Architecture and Programmer's Guide," pp. 11-14, Copyright 2000, Sun Microsystems, Inc., Palo Alto, California.

ORGANIC LIGHT EMITTING DIODE ("OLED") SECURITY AUTHENTICATION SYSTEM

FIELD OF TECHNOLOGY

Aspects of the invention relate to components for a constructing a smart card with enhanced security features.

BACKGROUND

Typically, sensitive data associated with a credit card is printed on a face (front or back) of the card. The sensitive data may include unique card number, card user's name, expiration date of the credit card number, a card verification value ("CVV") or any other suitable sensitive data.

The sensitive data may be visible to an onlooker who may obtain a copy (e.g., by taking a picture) of the sensitive data. The copy of the sensitive data may be used to initiate fraudulent transactions.

Typically, credit cards also include sensitive data encoded on a magnetic stripe. The sensitive data encoded on the magnetic stripe is read when the card is "swiped" through a card reader. Persons of malicious intent may utilize a skimming device to obtain a copy of the sensitive data encoded on the magnetic stripe. For example, a person of malicious intent may utilize a skimming device placed on or in an automated teller machine ("ATM"). The skimmer may be placed over a card slot reader of the ATM and may read the magnetic stripe as the card is inserted into the slot.

A credit card user may not notice that a skimmer has been placed on or in an ATM because the skimmer may not impede legitimate access to the ATM or card reader. Thus, the skimmer may obtain a copy of the sensitive data encoded on a credit card's magnetic stripe in a manner transparent to the user.

Technology is currently being developed that may reduce a risk of a person of malicious intent obtaining a copy of sensitive credit card data. For example, credit cards are now being produced with an "EMV" chips. EMV is a technology that derives its name from the companies (Europay, MasterCard, and Visa) that helped develop the technology. When the credit card and its associated EMV chip are inserted into a card reader, the card reader powers the EMV chip and the EMV chip generates a new authorization code each time the credit card is used. Thus, simply copying the sensitive data printed on the face of the credit card or encoded on the magnetic stripe may be insufficient to initiate a fraudulent transaction.

In addition to technology developed to specifically combat credit card fraud, it would be desirable to leverage other technological developments to design credit cards that are more resistant to exposure of sensitive data. However, credit cards are typically 85.60 millimeters ("mm")×53.98 mm×0.8 mm. This form factor allows credit cards to fit easily into a user wallet or pocket.

This small form factor presents design challenges when attempting to add electronic features to a credit card size device. For example, to maintain this small form factor, a credit card cannot be constructed using a large power supply.

On the other hand, incorporating electronic features into credit cards may provide technology-based solutions that more securely store sensitive data. Accordingly, it would be desirable to provide systems and methods for OLED security authentication systems.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1A:
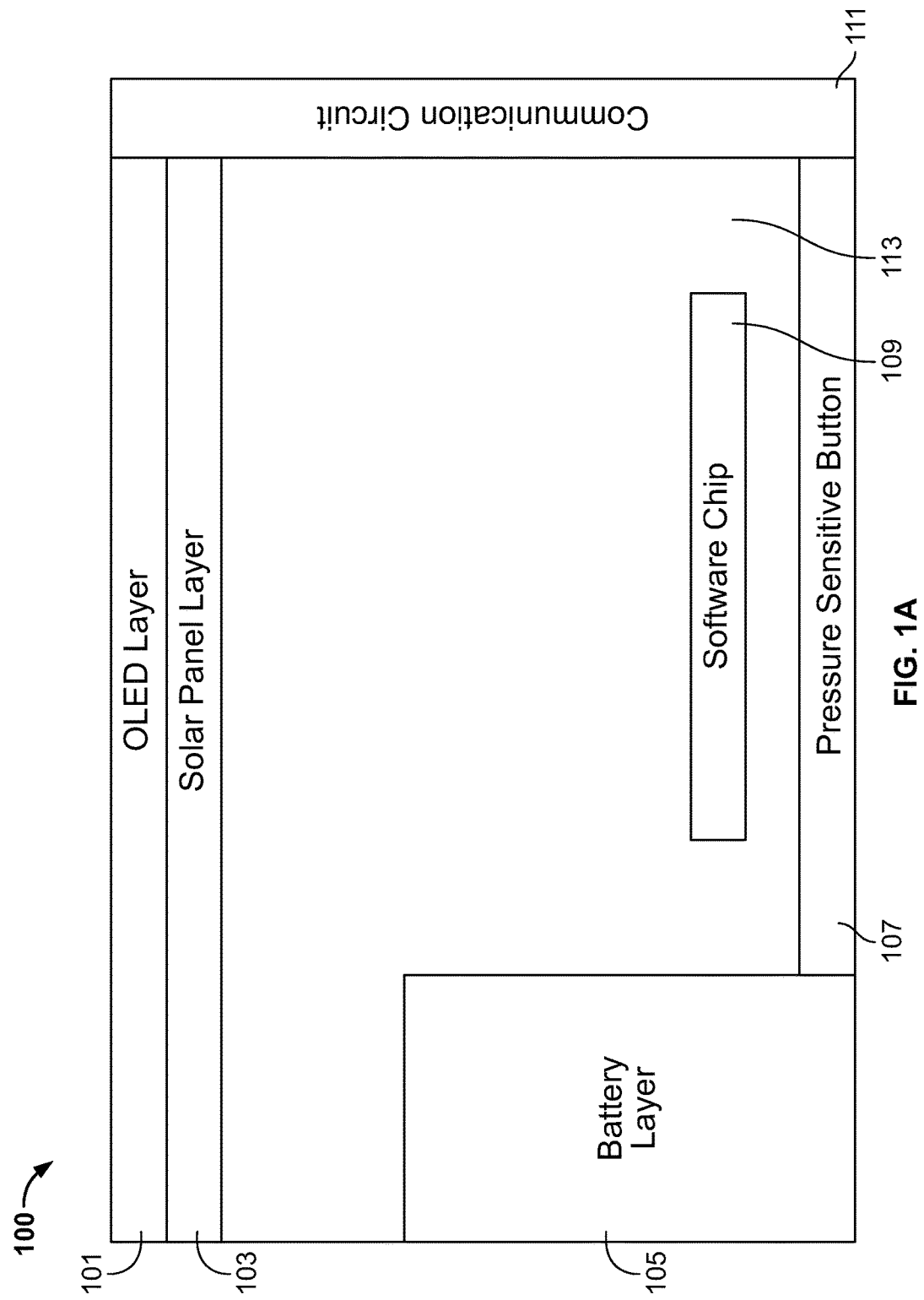
FIG. 1A shows illustrative apparatus in accordance with principles of the invention.

Aspects of the invention relate to a credit card size device that leverages organic light emitting diode ("OLED") technology to enhance security of sensitive data associated with a credit card.

OLEDs are typically a solid-state semiconductor constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, a display constructed using Liquid Crystal Display (hereinafter, "LCD") even to illuminate just one pixel in the LCD display, power must be supplied to the entire backlight. In an OLED display does not include a backlight. Typically, only the pixel that needs to emit light draws power.

Therefore, power efficiency of OLED technology presents a possibility for designing electronic credit cards (hereinafter, "smart cards") that provide enhanced security features.

The smart card may not include any sensitive data printed or embossed on a face of the smart card. The sensitive data may be electronically stored on the smart card. The smart card may store sensitive data associated with two or more credit cards. The smart card may include an OLED display for periodically displaying the sensitive data. The sensitive data stored on the smart card may be periodically altered. The sensitive data stored on the smart card may be deleted in response to detecting a potential security breach.

The smart card may include one or more biometric sensors. Illustrative biometric sensors may include a fingerprint scanner, camera, microphone or any other suitable sensor for capturing a biometric feature. To authenticate a release of sensitive data, a smart card user (hereinafter, "user") may press a finger against the fingerprint sensor, look into the camera or speak into the microphone to submit a biometric feature for verification. The smart card may only authorize release of the sensitive data after verifying the submitted biometric feature.

The smart card may enable more secure financial transactions. For example, online banking transactions may be made more secure by requiring entry of a valid biometric feature, such as a fingerprint, prior to authorizing a transaction. Embodiments may utilize a camera to verify a biometric feature or identify of a user before authorizing a transaction.

Embodiments may include pairing the smart card with a portal used to access sensitive data. A portal may include an online banking portal. When accessing the portal, the user may be required to verify that the smart card is present before gaining access to sensitive data via the portal.

Different levels of security may be required based on the sensitive data requested. Different levels of security may be required based on a desired transaction. For example, person-to-person money transfers conducted directly between a donor device and a recipient device may be subject to lower level security than transactions conducted by accessing a network node beyond a user's line-of-sight.

Apparatus for a smart card are provided. The smart card may include an OLED layer. The OLED layer may include an array of OLED. The array of OLEDs may form one or more pixels. The array of OLEDs may have a thickness that is not greater than 0.25 mm. The array of OLEDs may cover a surface area that is at least 90% of 85.60 mm×53.98 mm. The array of OLEDs may cover a surface area that is greater than 90% of 85.60 mm×53.98 mm.

The smart card may include a power source. The power source may be a battery. The power may include electromagnetic waves. The power source of the smart card may include a solar panel. The power source of the smart card may include a thermoelectric generator. The thermoelectric generator may utilize body heat to generate electricity.

The power source may have any suitable thickness. For example, the power source may be not greater than 0.8 mm thick.

The smart card may include a biometric sensor. The biometric sensor may include a camera. The biometric sensor may include a fingerprint reader. The biometric sensor may have a thickness that is not greater than 0.8 mm. The biometric sensor may have a thickness that is greater than 0.8 mm.

The smart card may include a communication circuit. The communication circuit may provide the smart card with the ability to connect and communicate over a network. The communication circuit may be configured to implement different protocols for wireless communication. For example, the communication circuit may provide WiFi, NFC, Bluetooth or any other suitable mode of wireless communication. The WiFi may include passive WiFi with low power consumption. The communication circuit may have any suitable thickness. For example, the communication circuit may have a thickness that is not greater than 0.8 mm or greater than 0.8 mm.

The smart card may include a processor circuit. The processor circuit may alternatively be referred to herein as a software chip. The processor circuit may include a processor for controlling overall operation of the smart card and its associated components. The smart card may include RAM, ROM, an input/output ("I/O") module and a non-transitory memory.

The I/O module may include a microphone, button and/or touch screen which may accept user provide input. The I/O module may include one or more of a speaker for providing audio output and a video display device for providing textual, audiovisual and/or graphical output. The video display may include one or more OLEDs.

Software may be stored within the non-transitory memory and/or other storage medium. The software may provide instructions to the processor for enabling the smart card to perform various functions. For example, the non-transitory memory may store software used by the smart card, such as an operating system, application programs, and an associated database. Alternatively, some or all of computer executable instructions of the smart card may be embodied in hardware or firmware components of the smart card.

Application programs, which may be used by the smart card, may include computer executable instructions for invoking user functionality related to communication, such as email, short message service (SMS), and voice input and speech recognition applications. Application programs may utilize one or more algorithms that verify a captured biometric feature, perform power management routines or other suitable tasks.

The smart card may operate in a networked environment. The smart card may support establishing network connections to one or more remote computers. Such remote computers may be nodes on a network. The nodes may be personal computers or servers that include many or all of the elements described above relative to the smart card. The network connections may include a local area network ("LAN") and a wide area network ("WAN"), but may also include other networks. When used in a LAN networking environment, the smart card may be connected to the LAN through a network interface or adapter. For example, the communication circuit may be the network interface or adapter.

When used in a WAN networking environment, the smart card may include a modem or other means for establishing communications over a WAN, such as the Internet. The communication circuit may include the modem.

It will be appreciated that the network connections shown are illustrative and other means of establishing a communications link between devices may be used. The existence of any of various well-known protocols such as TCP/IP, Ethernet, FTP, HTTP and the like is presumed, and the smart card can be operated in a client-server configuration to permit a user to retrieve web pages from a web-based server. Web browsers can be used to display and manipulate data on web pages.

The smart card and network nodes may include various other components, such as a battery, speaker, and antennas (not shown). For example, network nodes may be portable devices such as a laptop, tablet, smartphone or any other suitable device for receiving, storing, transmitting and/or displaying relevant information.

The smart card may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The processor circuit may include a non-tangible memory. An electronic signature of a fingerprint may be stored in the non-transitory memory. The processor circuit may include a processor. The processor circuit may have a thickness that is not greater than 0.25 mm.

In operation, the processor circuit may control operation of the biometric sensor and the communication circuit. For example, the processor circuit may instruct the communication circuit to power-on or power-off. The processor circuit may instruct the communication circuit to scan for a wireless network and connect to a node on the wireless network. The node may be a first node on the wireless network.

In response to connecting to the first node, the processor circuit may instruct the one or more OLED pixels to indicate a position of the biometric sensor. A position of the biometric sensor on an exterior of the smart card may not be visible to a user. For example, the smart card may include a biometric sensor embedded within a thickness of the smart card. The biometric sensor may be positioned below the OLED layer.

In some embodiments, an OLED layer may include an encapsulation sublayer. The biometric sensor may be positioned below an encapsulation layer that protects the OLED layer from physical damage, oxygen, moisture or other contaminants. The encapsulation layer may be formed from glass or plastic. The encapsulation layer may be transparent. Positioning the biometric sensor below the encapsulation layer may allow the encapsulation layer to be uniform across the smart card and uninterrupted by the biometric sensor.

A biometric sensor positioned underneath or within the OLED layer may not be readily visible from an outside of the smart card. To indicate a position of the biometric sensor, the one or more pixels in the array of OLEDs may illuminate and surround the biometric sensor. The illuminated pixels may identify a position of the biometric sensor below the encapsulation layer. The illuminated pixels may identify when the biometric sensor is active and ready to capture a biometric feature.

Illuminated pixels may also indicate success or failure of a biometric scan. For example, illuminated pixels surrounding the biometric sensor may be instructed (e.g., by the processor circuit) to glow green when the biometric sensor is ready to scan a biometric feature. The pixels may be instructed to glow red if the biometric feature has not been successfully captured or if the biometric sensor is not ready scan the biometric feature.

The biometric sensor may capture an electronic signature of a biometric feature, such as a fingerprint. In response to capturing the electronic signature of the fingerprint, the processor circuit may verify the biometric feature captured by the biometric sensor. For example, the processor circuit may compare an electronic signature of a fingerprint captured by the biometric sensor to the electronic signature of a registered fingerprint stored in the non-transitory memory. An electronic signature of the registered fingerprint may be stored in a secure section of the non-transitory memory. The electronic signature may be stored in the non-transitory memory during a registration procedure for the smart card.

If the captured electronic signature corresponds to the registered electronic signature stored on the smart card, the processor circuit may determine that the captured fingerprint is associated with an authorized user of the smart card. In some embodiments, verifying the biometric feature captured by the sensor may be used to authorize a financial transaction, release of sensitive data or other secure activity.

In response to verifying the biometric feature, the processor circuit may verify an authentication key received via the network. For example, in response to verifying the fingerprint, the smart card may validate a key received from a relying party. The relying party may operate a service accessible via one or more nodes of the network.

Validating the key received from the relying party may confirm that the authorized user of the smart in possession of the smart card and thereby implement a universal $2^{nd}$ factor ("U2F") protocol. An illustrative overview of the U2F protocol is described in the "Universal 2nd Factor (U2F) Overview" published by the FIDO Alliance and available at: https://fidoalliance.org/specs/fido-undefined-undefined-ps-20150514/fido-u2foverview-v1.0-undefined-ps-20150514.html, which is hereby incorporated by reference herein in its entirety.

A U2F protocol allows a relying party to augment security provided by a username/password by adding a second authentication factor to user logins or user requests for access to secure services. An U2F illustrative protocol may require the user to log into to a network node by providing a username and password. After presenting a valid username and password combination, the U2F protocol prompts the user to present a second factor device. The U2F protocol may prompt the user to present the second factor device at any time following user login.

For example, before authorizing a sensitive transaction or providing access to sensitive data, the U2F protocol may require that the user activate a second factor device. When the user activates the second factor device, the device may transmit a confirmation of the user's possession of the device to the relying party.

The smart card described herein may be the second factor device. To confirm possession of the smart card, the user may be required to present a biometric feature. Requiring a valid biometric feature to confirm possession of the smart card may implement a third factor of authentication.

In some embodiments, the smart card may include a mechanically actuated button or switch. The user may activate the smart card by moving the button or switch.

In response to verifying the biometric feature or other method of confirming user possession of the smart card, the processor circuit may transit confirmation of the user's presence to the relying party.

In some embodiments, the smart card may be paired to a user's mobile device or computer. When a request for sensitive data is received, the user may be required to confirm his or her physical presence by activating the smart card. In such embodiments, the smart card may confirm that it is physically present at or near the user's mobile device or computer. Upon confirming the physical presence of the smart card, the user's mobile device or computer may be authorized to release or receive sensitive data. In such embodiments, the smart card may act as a U2F device for authenticating the user with respect to any service or relying party that may require U2F authentication.

In some embodiments, the smart card may generate an authentication key. The authentication key may be generated based on the electronic signature of the captured biometric feature. For example, the authentication key may include a hashed value of the electronic signature of the user's fingerprint.

The processor circuit may instruct the communication circuit to transmit the randomly generated authentication key to a first network node. In response to receiving the authentication key, the first network node may allow the smart card to access sensitive data stored on a second network node or perform any other sensitive operation over the network.

For example, the smart card may submit a request for sensitive data. The sensitive data may include credit limits or other financial data associated with one or more financial accounts of the smart card user. The request for sensitive data may be received at the first network node.

To access the requested sensitive data (or service) that is accessible on a second network node, the first network node may require that the smart card user authenticate the request. The smart card user may authenticate the request by providing the authentication key generated based on a biometric feature verified by the smart card.

As discussed above with respect to the U2F protocol, in some embodiments, the smart card may receive an authentication request from a replying party via the first network node. For example, in the terminology of the U2F protocol of the FIDO Alliance, the smart card may receive a "key handle" via the first network node. The key handle may be generated when the user of the smart card registers the smart card to accesses services provided over the network by a replying party. Illustrative methods for registering a smart card are discussed in detail below. The smart card may attempt to verify that the received key handle is from a valid relying party.

A network node may be a point-of-sale ("POS") terminal. For example, the smart card may include sensitive data stored in a secure location in the non-transitory memory. The POS terminal may request the sensitive data, such as to pay for a purchase. For example, the sensitive data may include a name of the smart card user, bank account information, credit card number, expiration date of the credit card number, a card verification value ("CVV") or any other suitable sensitive data.

The smart card may be configured to release the sensitive data only when an authentication process is successfully performed. The authentication process may follow a U2F protocol. The authentication process may include validation of a biometric feature.

The smart card may determine an authentication process to implement based on one or more characteristics of the request for the sensitive data. Exemplary characteristics may include identity of the wireless network that transmitted the request to the smart card, geographic location of the smart card, identity of the relying party, value of an underlying transaction or a level of sensitivity associated with the requested data.

In some embodiments, the smart card may receive executable instructions via the network node. The executable instructions may specify an authentication process. A specific authentication process may be desired by the replying party, user or any other party that may bear risk associated with exposure of the sensitive data. In response to receiving the executable instructions, the smart card may implement the specified authentication process.

In some embodiments, the communication circuit may have a maximum transmission range. The maximum transmission range may be any suitable range. For example, the range may be 50 centimeters ("cm"). Within a range of 50 cm, wireless signals received by the smart card (e.g., from a node on a wireless network) may include enough energy to power one or more components of the smart card.

Limiting the transmission range of the smart card may limit interference with other smart cards. Limiting the transmission range may ensure that a node on the network is communicating with a target smart card. For example, a POS terminal may be configured to communicate with a target smart card when the smart card is within 4 cm of the POS terminal. Such a short range may ensure that the POS terminal is communicating with the smart card that is being used for a purchase at the POS terminal. The limited transmission range may reduce a likelihood of the POS terminal communicating with a smart card of another user on a checkout-line.

The smart card may be configured to implement a protocol for implementing near-field communication ("NFC"). Illustrative protocols for NFC are provided by the NFC Forum at www.nfc-forum.org.

In some embodiments, the smart card may have variable transmitting and receiving ranges. For example, the smart card may be configured to communicate using a typical WiFi range such as 150-300 ft. when searching for available wireless network. The smart card may only communicate over a typical NFC range (~2 in.) when transmitting or receiving sensitive data. The smart card may be configured to dynamically limit or expand transmitting and receiving ranges.

The smart card's power source may include high frequency signals received from a node on a wireless network. The smart card's power source may include a battery. The smart card may be configured to utilize received high frequency signals to recharge the battery. The battery may have any suitable thickness. For example, the battery may have a thickness that is not greater than 0.5 mm.

The smart card may be configured to display information by powering, and thereby illuminating, one or pixels on a face of the smart card. The pixels may be formed by an array of OLEDs.

For example, when the wireless communication circuit is in communication with a wireless network node, the processor circuit may instruct the array of OLEDs to display identification of the wireless network on a pre-determined surface area of the array of OLEDs. Displaying identification of the wireless network may allow a user to visually verify an identity of the wireless network. The user may determine if the network is a trusted network.

The network node may be a mobile device. For example, the smart card of a first user may connect to a mobile device of a second user. The first user may wish to sensitive data, such as electronic currency, to the second user. The smart card may store encrypted electronic currency in a secure portion of the non-transitory memory. The smart card of the first user may require successful authentication by the first user (e.g., biometric verification and/or U2F) before releasing electronic currency to the second user.

Apparatus for a smart card are provided. The apparatus may include an array of organic light emitting diodes ("OLEDs"). The array of OLEDs may form one or more pixels. The array of OLEDs may have a thickness that is not greater than 0.25 mm and having a surface area that is at least 90% of 85.60 mm×53.98 mm.

The smart card may include a pressure sensitive biometric sensor. In some embodiments, the pressure sensitive biometric sensor may be embedded within the array of OLEDs. For example, OLEDs may be flexible (or even rollable). Furthermore, material used to construct OLEDs may be transparent. Such OLED characteristics may allow an OLED constructed display to bend in response to applied pressure and actuate a mechanical button positioned underneath the OLED display. The mechanical button may be visible though transparent OLEDs. In some embodiments, pixels formed by the array of OLEDs may illuminate to identify a position of a mechanical actuator positioned below the OLED display.

A processor circuit may control various components of the smart card. The processor circuit may control operation of a biometric sensor and a wireless communication circuit. For example, in response to detecting pressure applied to the biometric sensor (or other mechanical actuator) the processor circuit may instruct the wireless communication circuit to scan for a wireless network. Upon detecting a wireless network, the processor circuit may connect to a node on the wireless network.

The processor circuit may instruct the biometric sensor to scan for a biometric feature, such as a fingerprint. The processor circuit may instruct OLEDs surrounding the biometric sensor to glow green (or any other suitable color or pattern) and indicate to a user that the sensor is ready to scan the fingerprint.

In response to the biometric sensor capturing a scan of the fingerprint, the processor circuit may verify the captured fingerprint. The verification may include confirming that an electronic signature of the captured fingerprint corresponds to an electronic signature a fingerprint registered by the user. The registered fingerprint may be stored in the non-transitory memory of the smart card.

The verification may include transmitting the electronic signature of the fingerprint captured by the biometric sensor to the network node. The network node may compare the captured fingerprint to a known electronic signature associated with the user's fingerprint. The network node may transmit the captured fingerprint to another network node that may perform the comparison. A network node may inform the smart card that the captured fingerprint does or does not match the known electronic signature.

In response to verifying the captured fingerprint, the processor circuit may also verify a U2F key handle received from a relying party, generate an authentication key or perform additional layers of authentication. In response to completing the authentication process, the processor circuit may instruct the wireless communication circuit release or obtain sensitive data.

The smart card may access a network by connecting to a first network node. The sensitive data may be stored on a second network node. Completing an authentication process may allow the first network node to access the second network.

In some embodiments, when the smart card is in communication with a network node, the processor circuit may instruct the array of OLEDs to mirror information displayed on a network node. For example, the network node may be a POS terminal. The processor circuit may instruct the array of OLEDs to mirror information being displayed to the user on the POS terminal.

In some embodiments, the user may respond to prompts of the POS terminal using the smart card. For example, in response to a request to confirm a purchase amount, the user may depress the pressure sensitive biometric sensor or touch an illuminated portion of the OLED display. The OLED display may be touch-sensitive.

In certain embodiments, a user may elect to override a requested biometric authorization. Instead of presenting a biometric feature, the user may enter a username and password. In some embodiments, the user may be prompted to enter a username and password if a biometric feature is unable to be captured after a predetermined number of attempts.

In some embodiments, the smart card may be the POS terminal. For example, to complete an online purchase, the replying party may prompt the user for information using the OLED display of the smart card. The user's response to the prompts of the relying party may also verify a physical presence of the user and/or smart card.

Apparatus for a smart card is provided. The smart card may include a flexible OLED display. The flexible OLED display may have a thickness that is not greater than 0.25 mm. The flexible OLED display may have any suitable surface area. For example, the flexible OLED display may have a surface area that is at least 100% 90%, 50%, or 30% of 85.60×53.98 mm.

Methods for registering a smart card are provided. Methods may include associating a user's biometric feature with a smart card. Methods may include associating one or more biometric features with the smart card. For example, a user may desire to present fingerprints of different fingers as authenticating biometric features.

In some embodiments, a user may be required to present a username and password to initiate registration of a biometric feature. In some embodiments, the smart card may be required to be inserted into a known secure device—such as an ATM—to initiate registration of a biometric feature.

A flexible OLED display of the smart card may present visual or textual prompts to a user during the registration process. For example, the flexible OLED display may instruct the user to present a biometric feature to a biometric sensor. The OLED display may glow green when the biometric sensor is awaiting presentation of a biometric feature. The OLED display may change to red if a presented biometric feature has not been successfully scanned or registered.

A one-time-PIN ("OTP") may be transmitted to a device of the user. For example, the OTP may be transmitted to the user's mobile device or to the smart card itself. The OTP may be displayed to the user using the OLED display. The OTP may be printed on packaging material associated with the smart card.

The user may enter the OTP to initiate the registration process. The user may enter the OTP using a touch sensitive OLED display of the smart card. The user may enter the OTP at a device other than the smart card. For example, the user may enter the OTP and begin a registration process at a POS terminal or ATM. In some embodiments, the user may call a service center to initiate registration of a biometric feature.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative side view of smart card 100. Smart card 100 includes OLED layer 101. OLED layer 101 may form a rollable, thin OLED display with lower power consumption than other display technology.

Smart card 100 may include a touch sensor (not shown). The touch sensor may be not greater than 0.001 mm thick. In some embodiments, the touch sensor may be embedded within OLED layer 101. Integrating the touch sensor into the OLED layer 101 may reduce reflectivity due to any space between the touch sensor and OLED layer 101. Reducing reflectivity may increase visibility of information presented using OLED 101 under direct sunlight.

Using OLED layer 101 to display information may have several technical advantages. OLEDs may provide lower power consumption, wider viewing angles, better colors, higher contrast, operate in a wider temperature ranges and enable faster refresh rates than other display technology. In some embodiments, OLED displays may be fabricated directly on control circuitry. OLED displays may only include minute amounts of heavy metals. Thus, when disposed of OLED display may be less harmful to the environment than other display technology.

Smart card 100 includes solar panel layer 103. OLED displays may be transparent when not illuminated. Thus when OLED layer 101 is not illuminated, OLED layer 101 may be transparent. Sunlight may pass through OLED layer 101 and reach solar panel layer 103. Solar panel layer 103 may convert the solar energy into electricity that powers one or more components of smart card 100. Solar panel layer 103 may be thin enough to be flexible.

Smart card 100 includes battery 105. Battery 105 may be rechargeable. Battery 105 may be flexible. Battery 105 may be recharged by power generated by solar panel layer 103. Battery 105 may be rechargeable from a power source external to smart card 100.

Smart card 100 includes software chip 109. Software chip 109 may control overall operation of smart card 100 and its associated components. Software chip 109 may include the processor circuit. Software chip 109 may include a non-transitory memory. Smart card 100 may include non-transitory memory locations (not shown) within thickness 113. Software chip 109 may access such memory locations. The non-transitory memory locations may store instructions, that when executed by software chip 109, enable smart card 100 to perform various functions.

For example, memory locations may store software used by smart card 100, such as an operating system, application programs and an associated database.

Smart card 100 includes wireless chip 111. Wireless chip 111 may be the communication circuit. Wireless chip 111 may provide smart card 100 with wireless communication functionality. Wireless chip 111 may enable smart card 100 to communicate using a variety of communication protocols including, WiFi, Bluetooth, Ethernet, NFC and cellular telecommunications.

Smart card 100 also include pressure sensitive button 107. Pressure sensitive button 107 may be mechanically actuated. Actuation of pressure sensitive button 107 may provide an electronic signal to software chip 109.

For example, mechanical actuation of pressure sensitive button 107 may power-on and/or power-off software chip 109. Mechanical actuation of pressure sensitive button 107 may inform software chip 109 of a user's selection of choices displayed using OLED layer 101.

FIG. 1 shows illustrative components 101-113 of smart card 100 in an arrangement within a thickness of smart card 100. The arrangement shown in FIG. 1 is illustrative. Smart card 100 may include additional components not shown in FIG. 1, such as a biometric sensor. One or more of components 101-113 and any additional components may be arranged within smart card 100 in any suitable fashion. For example, pressure sensitive button may be located in space 113. OLED layer 101 and/or solar panel layer 103 may flex or bend to allow a user to mechanically actuate pressure sensitive button 107.

Some embodiments may not include all of components 101-113. For example, a smart card may not include solar panel layer 103 or pressure sensitive button 107.

Figure 1B:
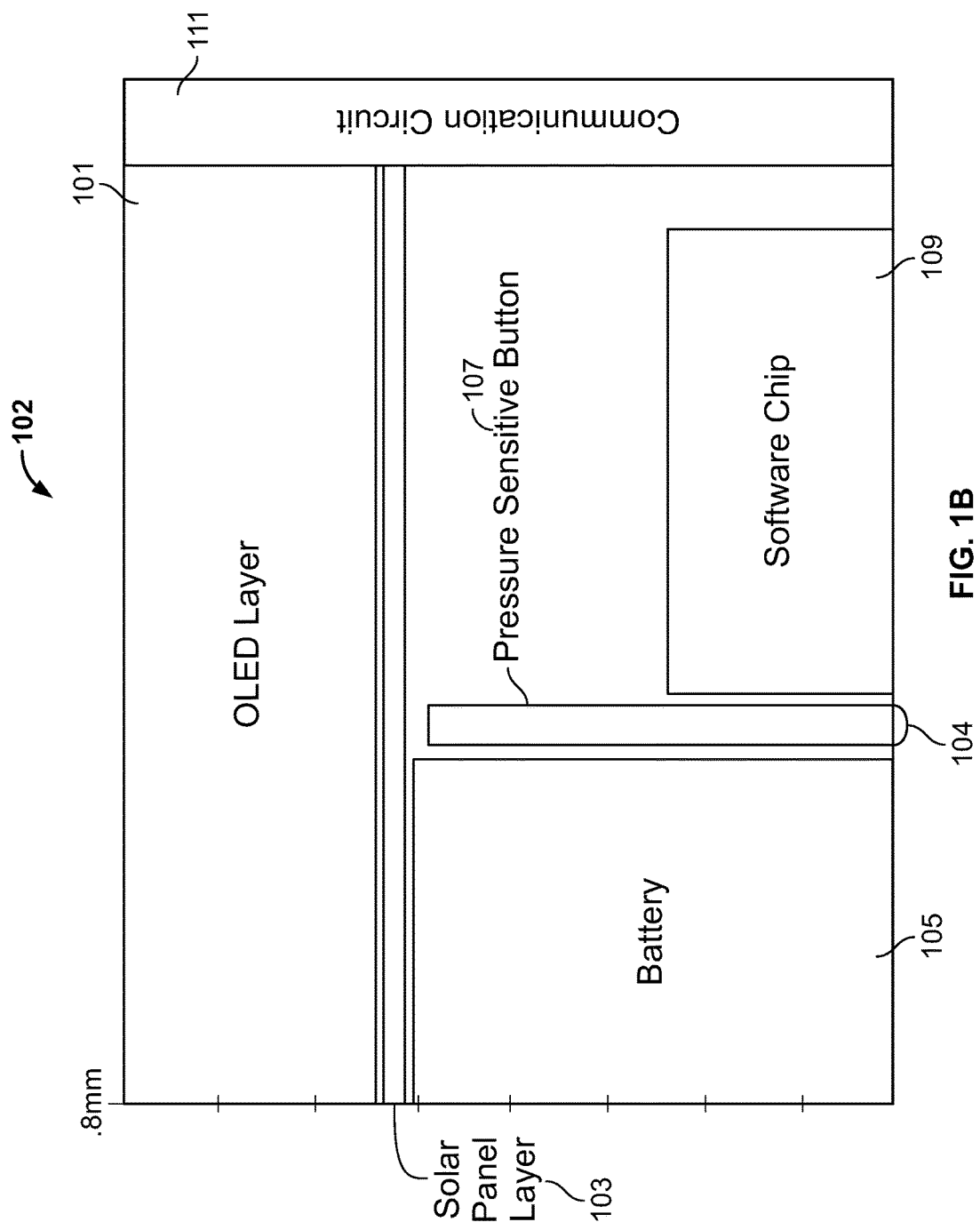
FIG. 1B shows illustrative apparatus in accordance with principles of the invention.

FIG. 1B shows illustrative view 102 of a smart card having a thickness of 0.8 mm. View 102 shows a view along a thickness of smart card 102. View 102 shows illustrative thicknesses of components 101-111. View 102 shows that in some embodiments, pressure sensitive button may include a portion 104 that protrudes from a surface of a smart card. In some embodiments, pressure sensitive button may include a portion 104 that dips below a surface of the smart card.

Figure 2:
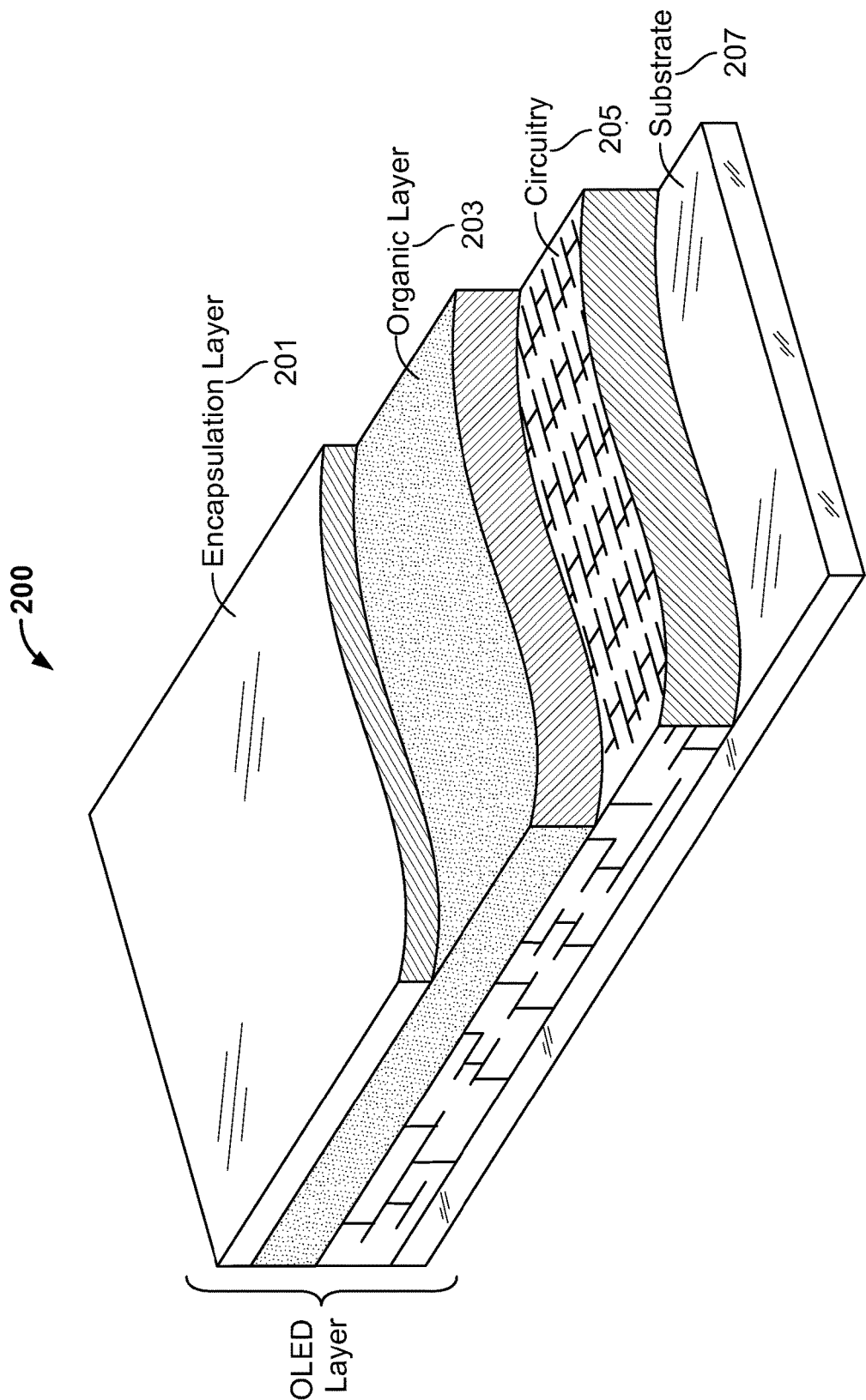
FIG. 2 shows illustrative apparatus in accordance with principles of the invention.

FIG. 2 shows structures 200 of an illustrative OLED layer, such as OLED layer 101 (shown in FIG. 1). Structures 200 include four layers: encapsulation layer 201, organic layer 203, circuitry layer 205 and substrate layer 207.

Encapsulation layer 201 protects the OLED layer from exposure to oxygen, water and other contaminants. Preferably, encapsulation layer 201 is flexible and transparent. Glass is typical material for constructing encapsulation layer 201. When glass is used to construct encapsulation layer 201, the glass may be very thin and flexible. For example, the glass may be between 50 micrometers ("µm") and 100 µm thick.

In some embodiments, encapsulation layer 201 may be constructing using thin-film encapsulation techniques such as Atomic Layer Deposition ("ALD"). ALD is a process that utilizes chemicals that when deposited on a material react to create a solid, thin film.

Structures 200 include organic layer 203.

Organic layer 203 typically includes an emissive solid-state semiconductor. Organic layer 203 may be constructed from a thin film of organic (carbon-based) material. For example, organic layer 203 may include one or more organic light emitting diodes. When electricity is applied to a diode within organic layer 203, electrons flow through organic layer 203 and release photons, thereby emitting light. Different types of emissive materials may be used. Each type of material may be associated with a different color light. An intensity of light emitted by organic layer 203 may be controlled by the amount of electricity flowing through organic layer 203.

Organic layer 203 may be doped with "host" materials. Host material may affect properties, such as power efficiency, of organic layer 203. For example, organic layer 203 may be doped with emitter materials that improve its operation and/or achieve a desired color.

Organic layer 203 may include two or more sub-layers (not shown). For example, organic layer 203 may include 5, 10 or 15 sublayers. Illustrative sub-layers (not shown) may include: (1) an electron transport layer, (2) a blocking layer, (3) an emissive layer, (4) a hole transport layer and an (5) injection layer. The sub-layers may enhance an efficiency of the emissive layer.

In operation, an emissive layer may be placed between a cathode and an anode. When electricity is applied, electrons flow from the cathode to the anode. OLED displays may be driven by either electrical current or voltage. In a preferred embodiment, the OLED display is driven by current. The cathode inserts electrons into the emissive layer, and the anode removes the electrons. The electron "flow" through the emissive layer releases photons, generating light. The color of the generated light may be changed by including different types of materials within the emissive layer.

A direction of light emitted by the organic layer may be controlled by a degree of transparency of the anode and/or cathode. In some embodiments, a cathode may be reflective. Such a cathode may be constructing using an aluminum based-compound or lithium fluoride. An anode may be transparent. A transparent anode may preferably be constructed using indium tin oxide. In such embodiments, when current flows between the cathode and anode, light is emitted through circuitry layer 205 and substrate 207. Such embodiments may be referred to as "bottom-emitting OLEDs."

In some embodiments, the cathode may be transparent. Such a cathode may preferably be constructed using indium tin oxide. The anode may be reflective. The reflective anode may direct light toward the transparent cathode. Such embodiments may be referred to as "top-emitting OLEDs." Typically, top-emitting designs are more efficient and are used to construct higher resolution displays.

Additionally, top-emitting designs may allow organic layer 203 to be formed on a non-transparent substrate. Small- and medium-sized OLED displays (e.g., 1-7 inches) are typically constructed using top-emitting techniques.

Organic layer 203 may form one or more pixels. Different architectures are available for forming pixels using OLEDs. One architecture includes positioning different color (e.g., red, green and blue) OLEDs adjacent to each other. Another architecture includes stacking different color OLEDs on top of each other. OLEDs may be stacked because materials used to construct OLED layer 203 may be transparent. A stacked design may provide a smaller pixel size and higher resolution.

Structures 200 include circuitry layer 205. Circuitry layer 205 includes electronics that drive one or more pixels formed within organic layer 203. Preferably, amorphous silicon (a-Si) and low temperature polysilicon (LIPS) may be used to construct circuitry layer 205. In some embodiments, circuitry layer 205 may be transparent.

Substrate layer 207 supports circuitry layer 205, organic layer 203 and encapsulation layer 201. Substrate layer 201 may be constructed using various materials. For example, substrate layer 207 may be constructed using glass, plastic or metal materials. In some embodiments, such as in bottom-emitting OLEDs, substrate layer 207 may function as encapsulation layer 201.

Figure 3:
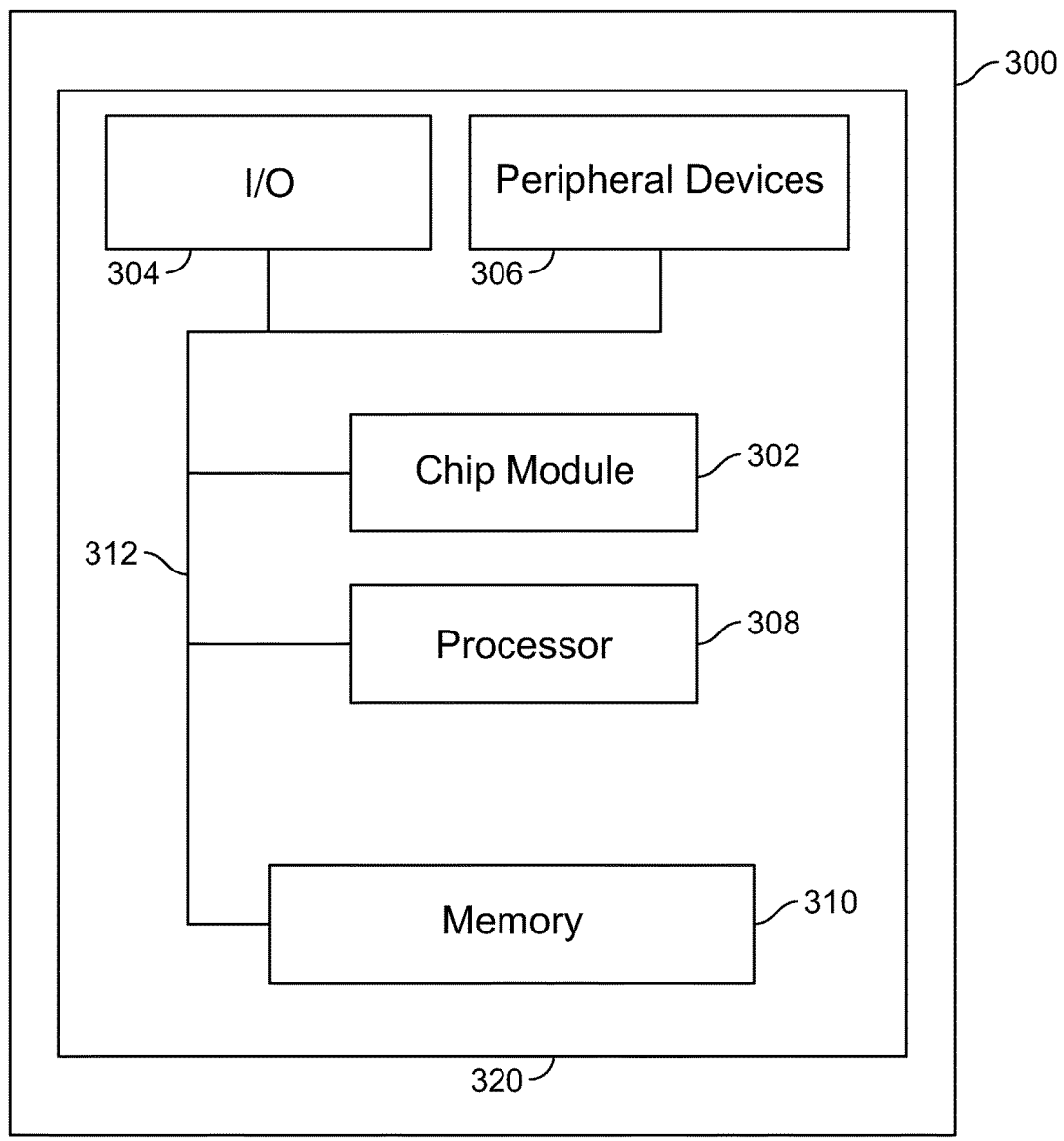
FIG. 3 shows illustrative apparatus in accordance with principles of the invention.

FIG. 3 shows an illustrative software chip 300. Software chip 300 may include chip module 302, which may include one or more integrated circuits, and which may include logic configured to perform any suitable logical operation.

Software chip 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable encoded media or devices; peripheral devices 306, which may include counter timers, real-time timers, power-on reset generators or any other suitable peripheral devices; logical processing device 308, which may compute data structural information, structural parameters of the data, quantify indices; and machine-readable memory 310.

Machine-readable memory 310 may be configured to store, in machine-readable data structures: user account information, electronic signatures of biometric features or any other suitable information or data structures.

Components 302, 304, 306, 308 and 310 may be coupled together by a system bus or other interconnections 312 and may be present on one or more circuit boards such as circuit board 320. In some embodiments, the components may be integrated into a single chip. The chip may be silicon-based.

FIGS. 4-9 show illustrative layers that may be present within an illustrative smart card.

Figure 4:
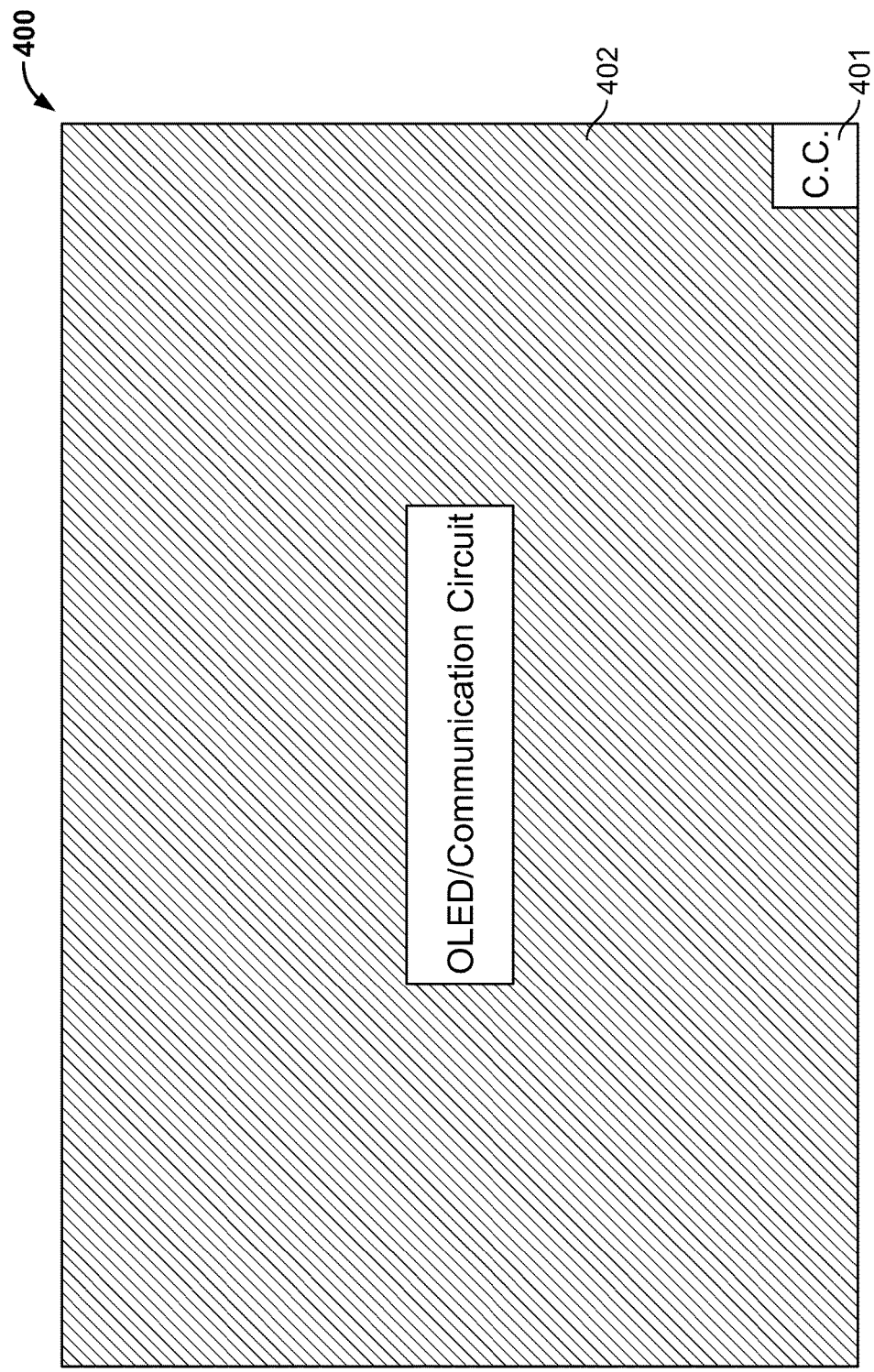
FIG. 4 shows illustrative apparatus in accordance with principles of the invention.

FIG. 4 shows illustrative layer 402. Layer 402 includes OLED layer (such as OLED layer 200, shown in FIG. 2). FIG. 4 also shows that, in some embodiments, communication circuit 401 may penetrate layer 402.

Figure 5:
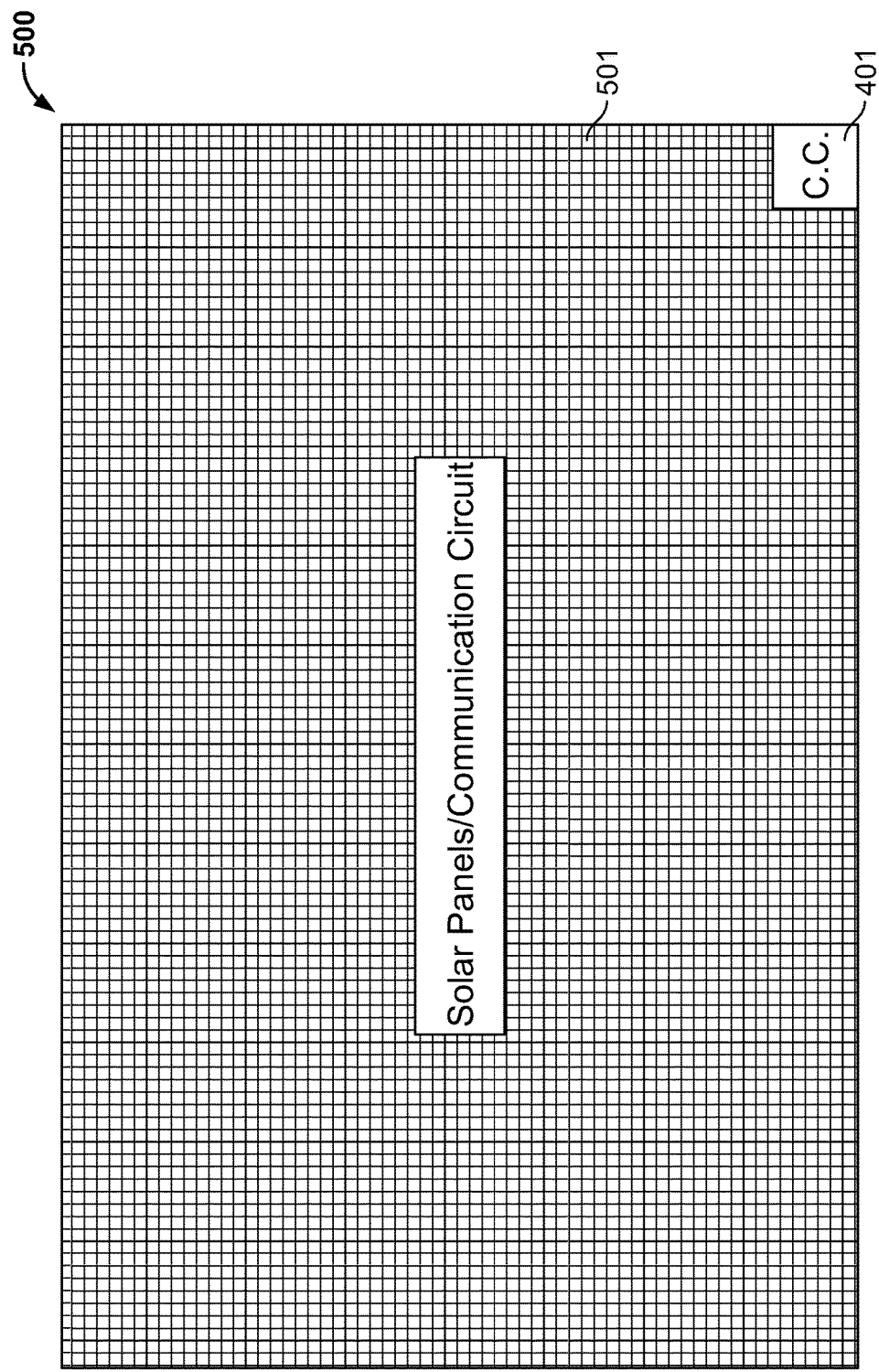
FIG. 5 shows illustrative apparatus in accordance with principles of the invention.

FIG. 5 shows illustrative layer 500. Layer 500 includes solar panels 501 that may be used to power various components of a smart card (e.g., circuitry layer 205, shown in FIG. 2). FIG. 5 also shows that, in some embodiments, communication circuit 401 may penetrate layer 500.

Figure 6:
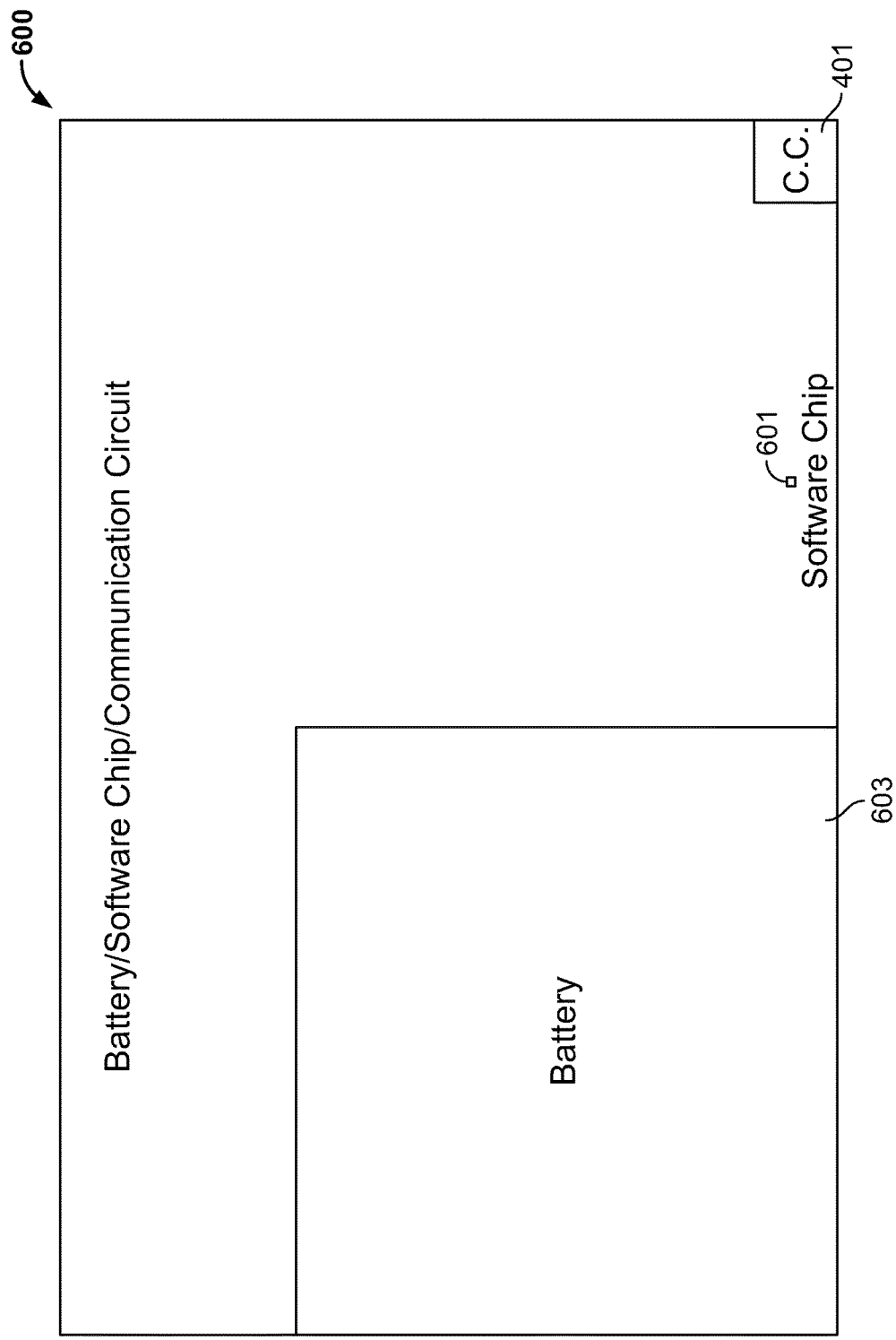
FIG. 6 shows illustrative apparatus in accordance with principles of the invention.

FIG. 6 shows illustrative layer 600. Layer 600 includes software chip 601. Software chip 601 may include one or more features of software chip 109 (shown in FIG. 1). Layer 600 includes battery 603. Battery 603 may include one or more features of battery layer 105 (shown in FIG. 1). FIG. 6 shows that, in some embodiments, communication circuit 401 may penetrate layer 600.

Figure 7:
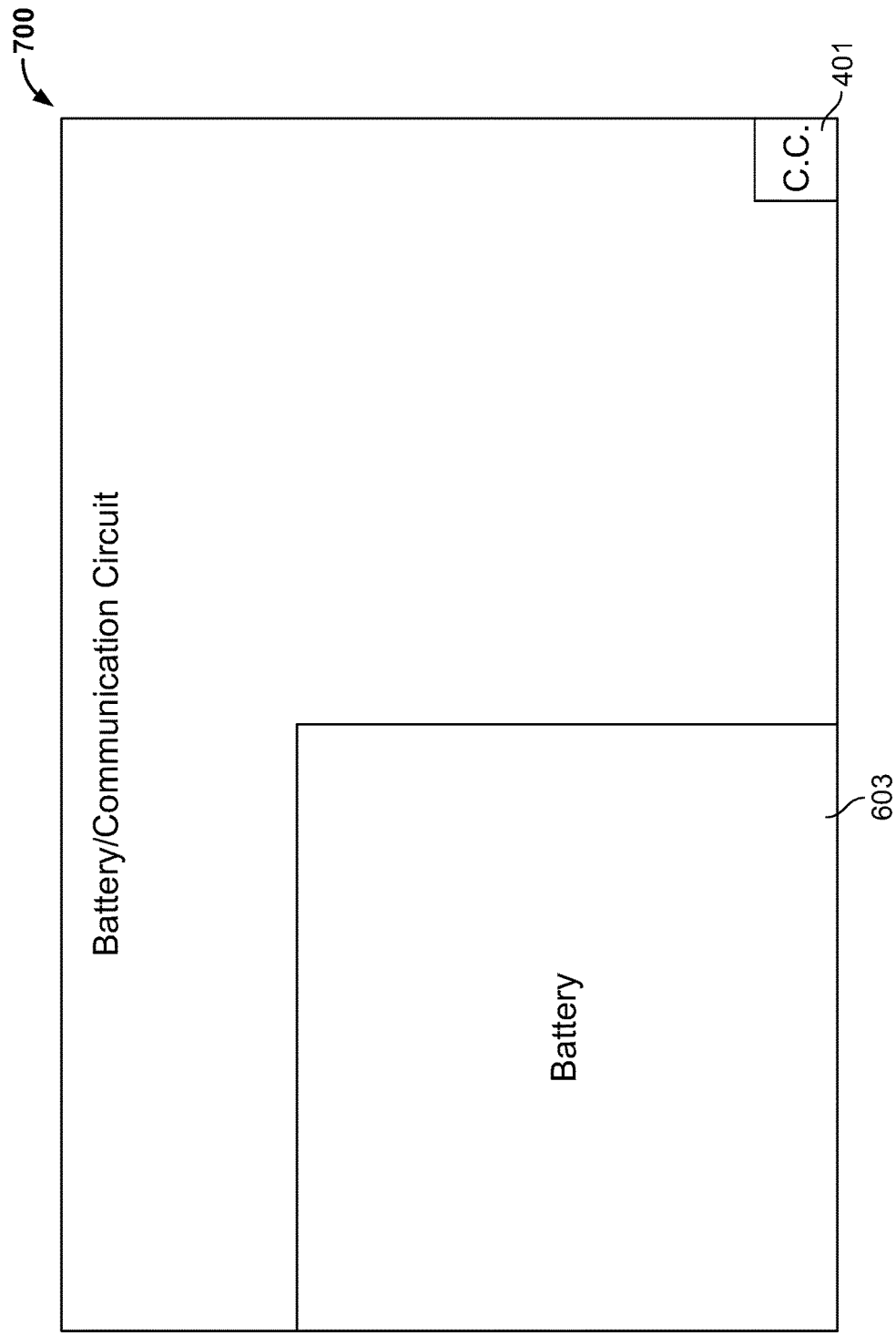
FIG. 7 shows illustrative apparatus in accordance with principles of the invention.

FIG. 7 shows illustrative layer 700. FIG. 7 shows that, in some embodiments, battery 603 may penetrate layer 700. FIG. 7 shows that, in some embodiments, communication circuit 401 may penetrate layer 700.

Figure 8:
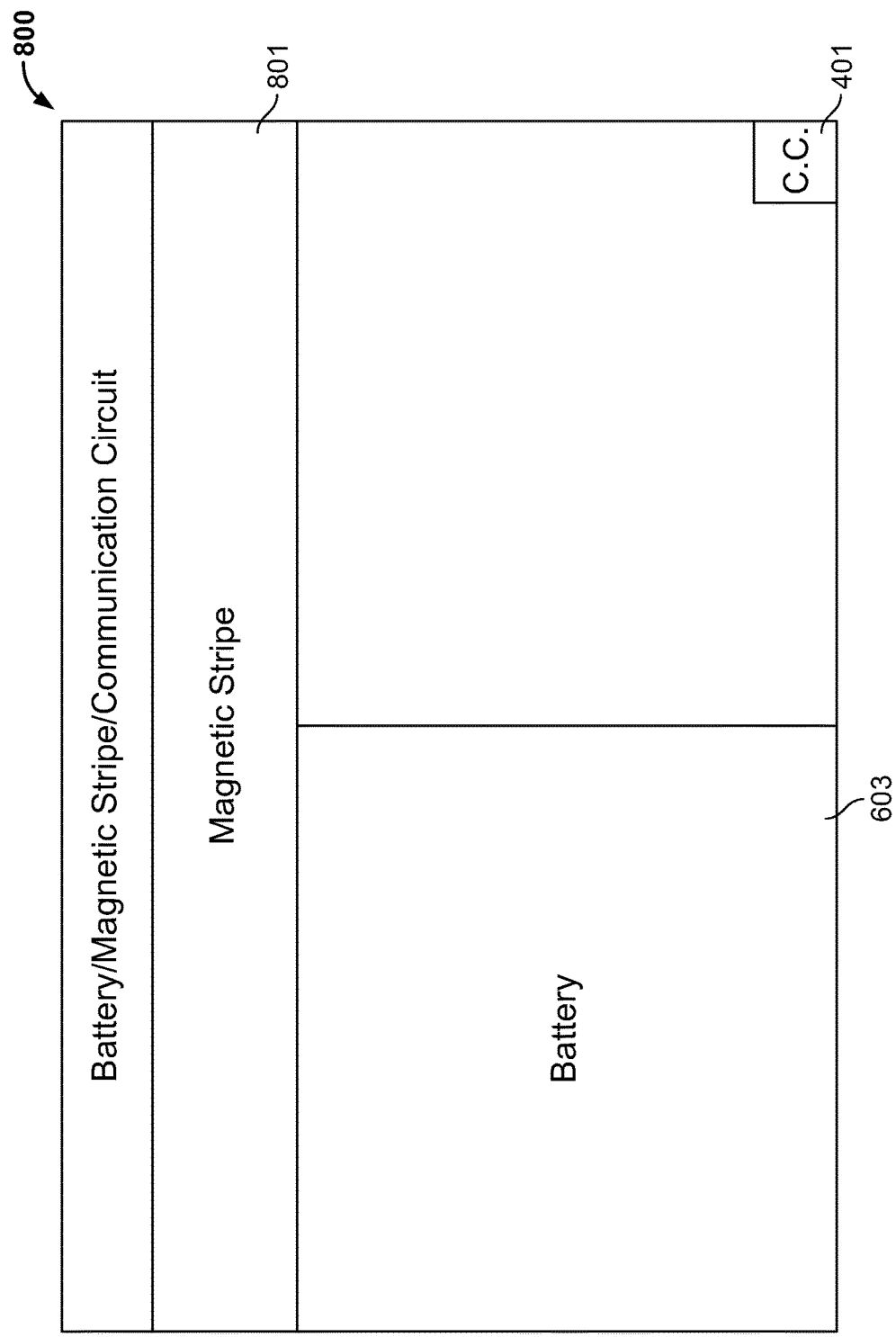
FIG. 8 shows illustrative apparatus in accordance with principles of the invention.

FIG. 8 shows illustrative layer 800. FIG. 8 shows that, in some embodiments, battery 603 may penetrate layer 800. FIG. 8 shows that, in some embodiments, communication circuit 401 may penetrate layer 800.

FIG. 8 shows that layer 800 may include magnetic stripe 801. Magnetic stripe 801 may include magnetically encoded information. Magnetic stripe 801 may provide backwards compatibility for smart cards described herein.

Figure 9:
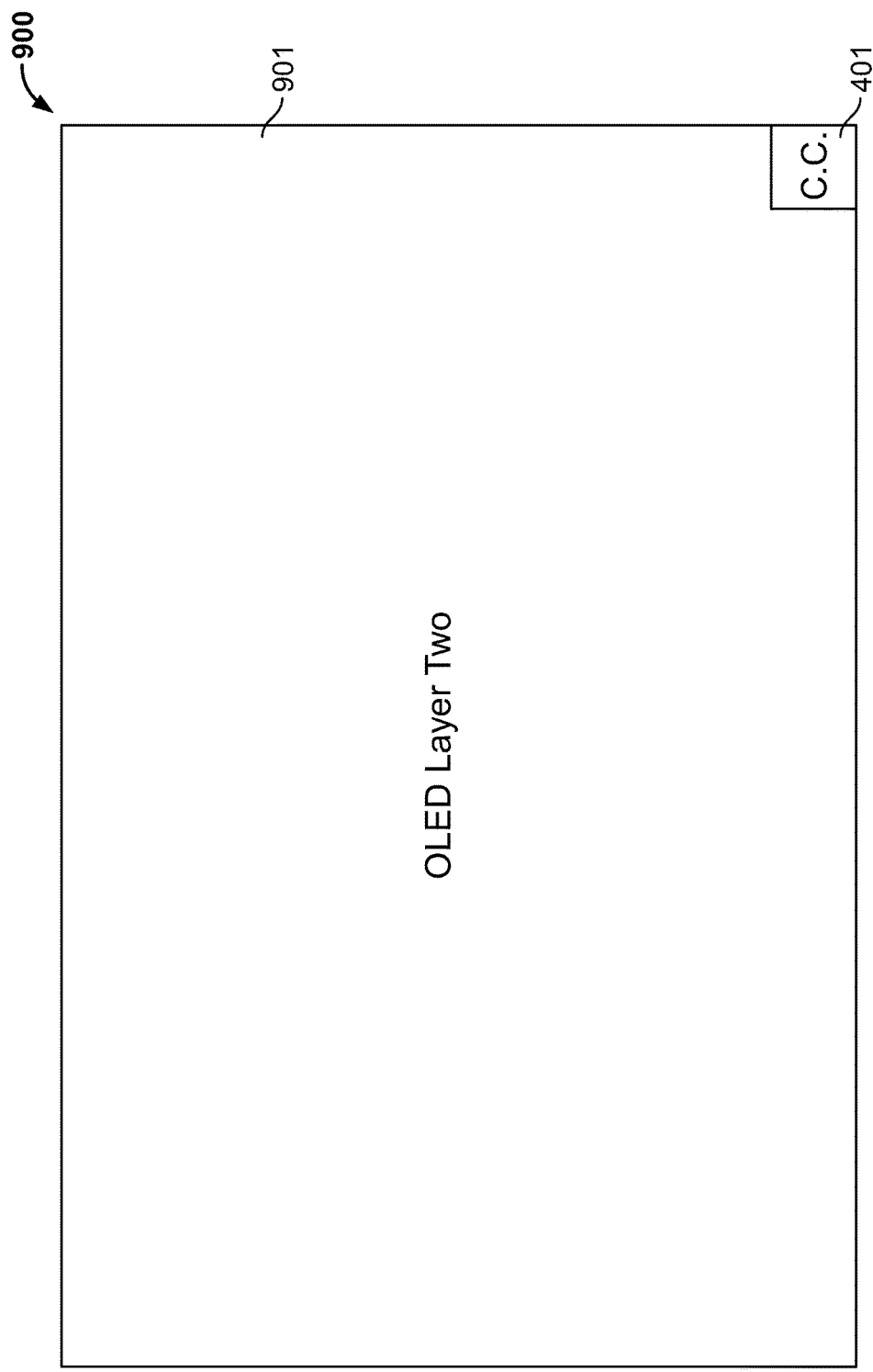
FIG. 9 shows illustrative apparatus in accordance with principles of the invention.

FIG. 9 shows illustrative layer 900. Layer 900 includes a second OLED layer 901. Second OLED layer 901 may include one or more features of OLED layer 200 (shown in FIG. 2). Second OLED layer 901 may allow a front and back face of a smart card to include an OLED display. FIG. 9 also shows that communication circuit 401 may penetrate layer 900.

Figure 10:
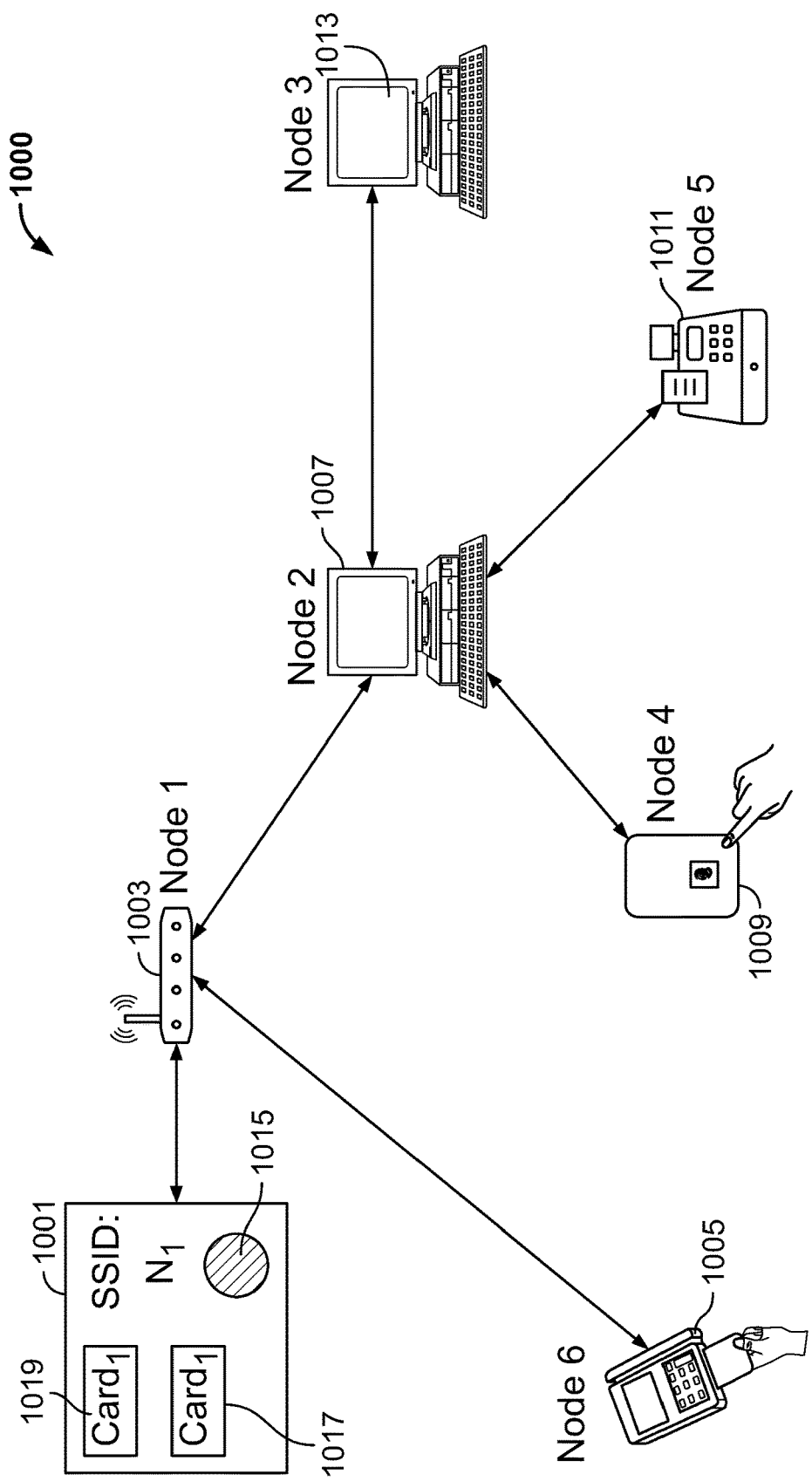
FIG. 10 shows illustrative apparatus in accordance with principles of the invention.

FIG. 10 shows illustrative network architecture 1000. Network architecture 1000 shows illustrative network nodes that may be accessed by smart card 1001. For example, smart card 1001 may access the network via access point 1003. The network may be a wireless network. The network may be a wired network. The network may include a combination of wired and wireless nodes. The network may include two or more networks. For example, node 3 (1013) may represent a second network accessible via node 2 (1007).

Access point 1003 may enable smart card 1001 to access other nodes on the network. In some embodiments, one or more of nodes 1-6 may be access points. Smart card 1001 may display an identity of the network on an OLED screen. The screen may include one or more features of OLED layer 200 (shown in FIG. 2). Smart card 1001 may be prompted to authenticate itself to one or more nodes on the network.

Smart card 1001 may display available account information 1017 and 1019 stored on smart card 1001. In some embodiments, when prompted by POS terminal 1011, a user may touch the displayed account information to select account information to pay for a purchase.

In some embodiments, before smart card 1001 transmits account information 1017 or 1019 to POS terminal 1011, the user may be required to verify his/her presence by pressing button 1015. In some embodiments, button 1015 may include a biometric scanner, such as a fingerprint reader. In some embodiments, POS terminal 1011 may prompt the user to present a biometric feature using biometric scanner 1009.

For example, utilizing biometric scanner 1009 may avoid the user having to physically access smart card 1001 (e.g., remove it from a wallet). In some embodiments biometric scanner 1009 may be integrated into POS terminal 1011.

In some embodiments, smart card 1001 may be swiped though legacy card reader 1005. Legacy card reader 1005 may read account information stored on magnetic stripe 801 (shown in FIG. 8). To provide more secure authentication, user may be prompted to depress button 1015 or present a biometric feature using a biometric scanner embedded into button 1015. Smart card 1001 may attach a date/time stamp to the button press or biometric scan. Smart card 1001 may transmit a result of the biometric scan or date/time stamp to a network node. The transaction may be approved or denied based on a result of the biometric scan.

For example, the node may require verification that the scanned biometric feature matches a known biometric feature associated with the user of smart card 1001. The verification may be performed by smart card 1001 or by a node on the network. As a further example, the node may require that the date/time stamp be received within a predetermined threshold time of the date/time stamp.

Figure 11:
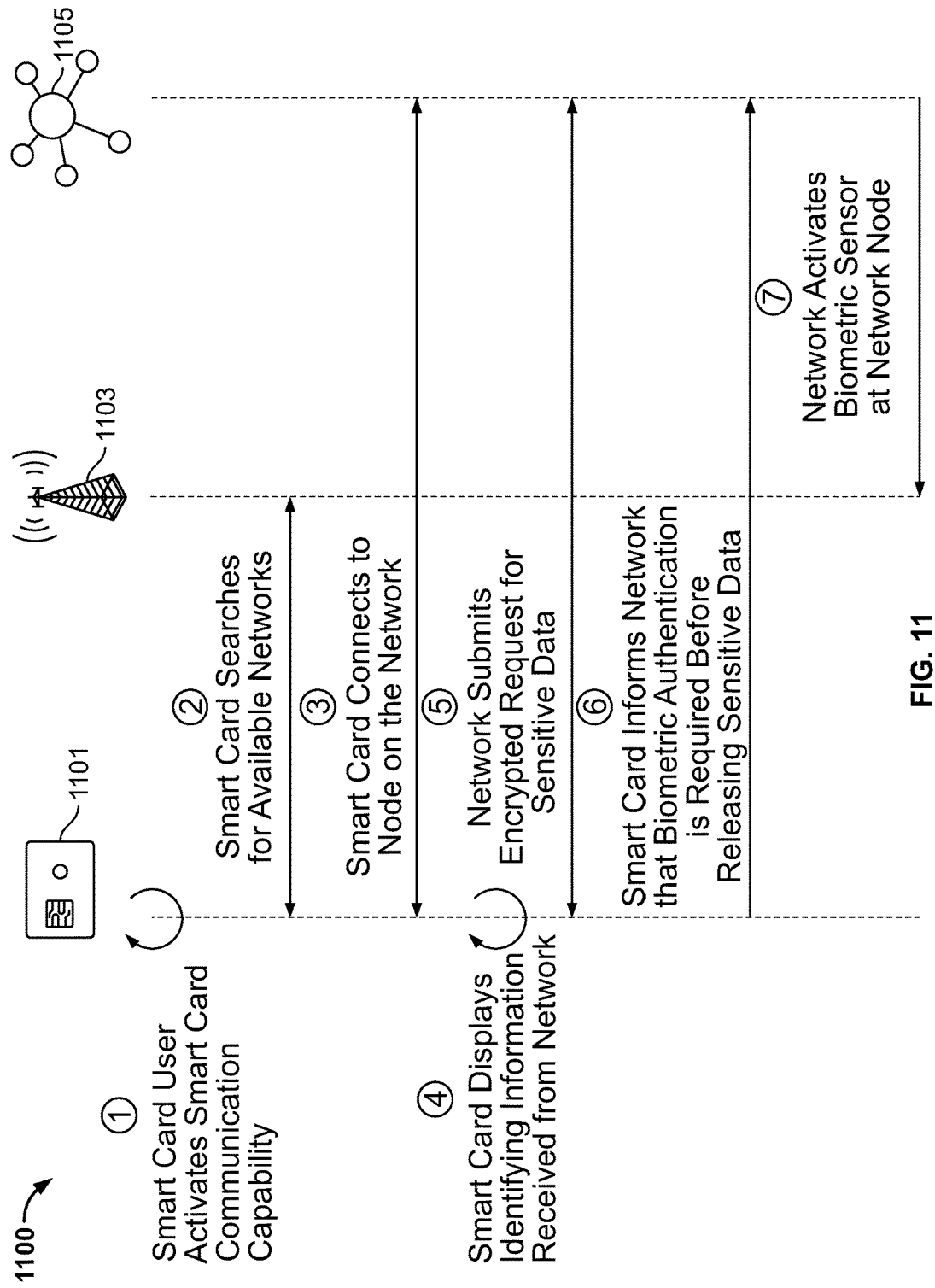
FIG. 11 shows an illustrative process in accordance with principles of the invention.
Figure 11:
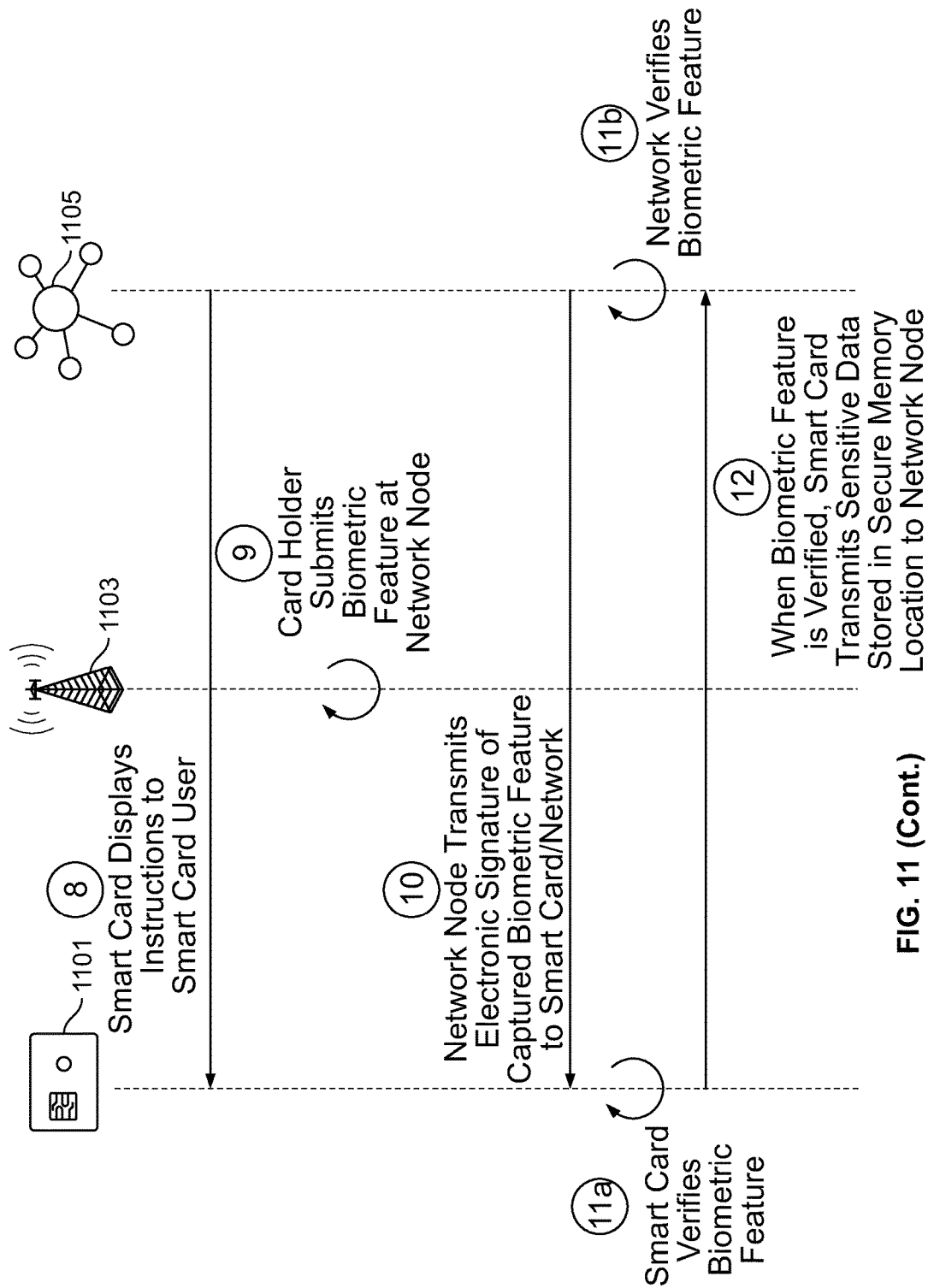

FIG. 11 shows illustrative transmission flow 1100. Transmission flow 1100 may begin at step 1 when a smart card user activates a communication circuit of smart card 1101. The smart card user may activate the communication circuit by pressing a button or switch on smart card 1101. In some embodiments, the communication circuit may be activated automatically when smart card 1101 is positioned within a card reader or within range of network access point 1103.

The communication circuit of smart card 1101 may include communication circuit 111 (shown in FIG. 1). The communication circuit of smart card 1101 may include an EMV chip, magnetic stripe or any suitable feature that may communicate information stored on smart card 1101.

At step 2, smart card 1101 may search for available networks and locate network access point 1103. At step 3, smart card 1101 connects to network 1105 via network access point 1103.

At step 4, smart card 1101 displays identifying information received from network 1105. Such identifying information may include a name, location, service provider or any other suitable information that may identify network 1105. Such information may provide an additional level of security to a user of smart card 1101. Displaying network identification information may inform the user whether smart card 1101 is communicating over a known, trusted or expected network.

At step 5, network 1105 submits a request for sensitive data stored on smart card 1101. Such sensitive data may include credit card information, bank account information, or any information that if erroneously released may have a detrimental financial effect on the user of smart card 1101. At step 6, smart card 1101 informs network 1105 that to release the sensitive data stored on smart card 1101, a biometric authentication is required. At step 7, network 1105 activates a biometric sensor at network node 1103.

At step 8, smart card 1101 displays instructions to the smart card user. The instructions may inform the user that network 1105 is requesting sensitive data stored on smart card 1101. The instructions may inform the user that biometric authentication is required before releasing the sensitive data to network 1105. The instructions may inform the user that a biometric sensor at node 1103 has been activated and is waiting for the use to present a biometric feature at node 1103.

At step 9, the smart card user presents a biometric feature at node 1103. In some embodiments, the biometric feature may be captured using a biometric sensor embedded within smart card 1101. In some embodiments, to authorize the release of the sensitive data, smart card user may be required to confirm a physical presence of smart card 1101, such as by providing a U2F authentication.

At step 10, the captured biometric feature (or electronic signature of such feature) is transmitting to one or more of smart card 1101 and/or network 1105. At steps 11a and 11b, one or more of smart card 1101 and network 1105 may verify that the biometric feature is in fact associated with the smart card user.

At step 12, in response to verifying the biometric feature, smart card 1101 transmits the sensitive data to network 1105.

Figure 12:
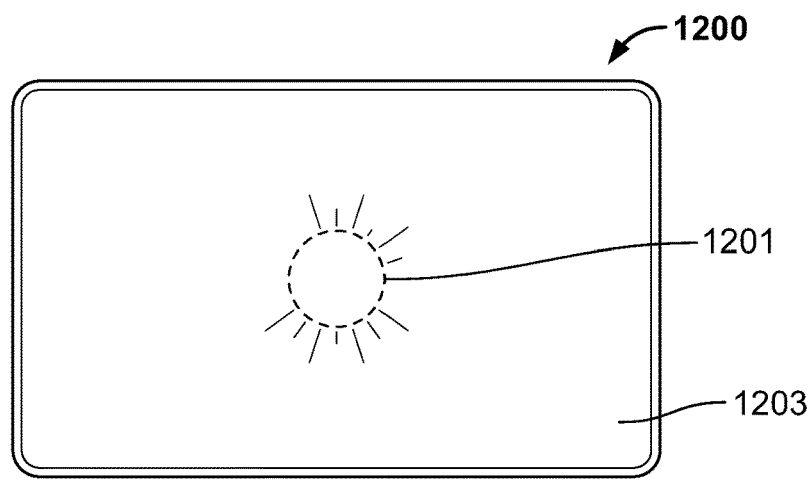
FIG. 12 shows illustrative apparatus in accordance with principles of the invention.

FIG. 12 shows illustrative smart card 1200. Smart card 1200 includes a biometric sensor that is positioned underneath OLED display 1203. OLED display 1203 may illuminate around biometric sensor 1201 to show a user where biometric sensor 1201 is positioned. In some embodiments, OLED display 1203 may illuminate around biometric sensor 1201 to indicate a status of biometric sensor 1201. For example, OLED display 1203 may show a green color around biometric sensor 1201 to indicate that biometric sensor has successfully captured a biometric feature.

Figure 13A:
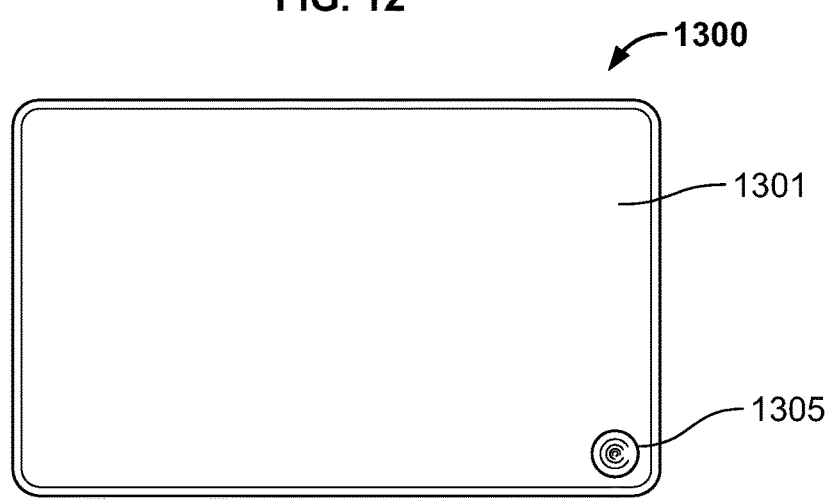
FIG. 13A shows illustrative apparatus in accordance with principles of the invention.
Figure 13B:
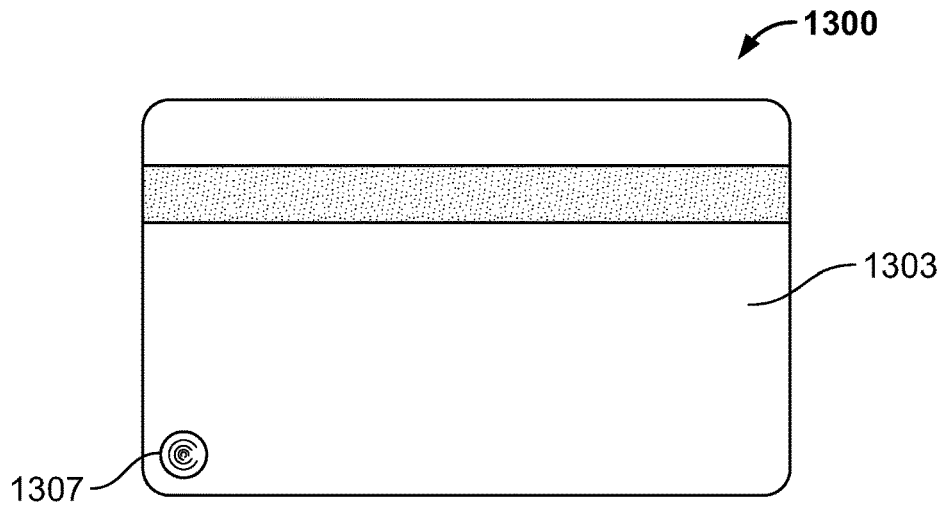
FIG. 13B shows illustrative apparatus in accordance with principles of the invention.

FIG. 13A shows illustrative front face 1301 of smart card 1300. Front face 1301 includes biometric sensor 1305. Biometric sensor 1305 may include a pressure sensitive actuator. FIG. 13B shows illustrative back face 1303 of smart card 1300. Back face 1303 includes biometric sensor 1307. A user of smart card 1300 may be authenticated by presenting a biometric feature using one or both of biometric sensors 1305 and 1307. Biometric sensors 1305 and 1307 may be poisoned such that when the user holds smart card 1300 between a thumb and index finger, biometric sensors 1305 and 1307 capture fingerprints of both fingers.

Figure 14:
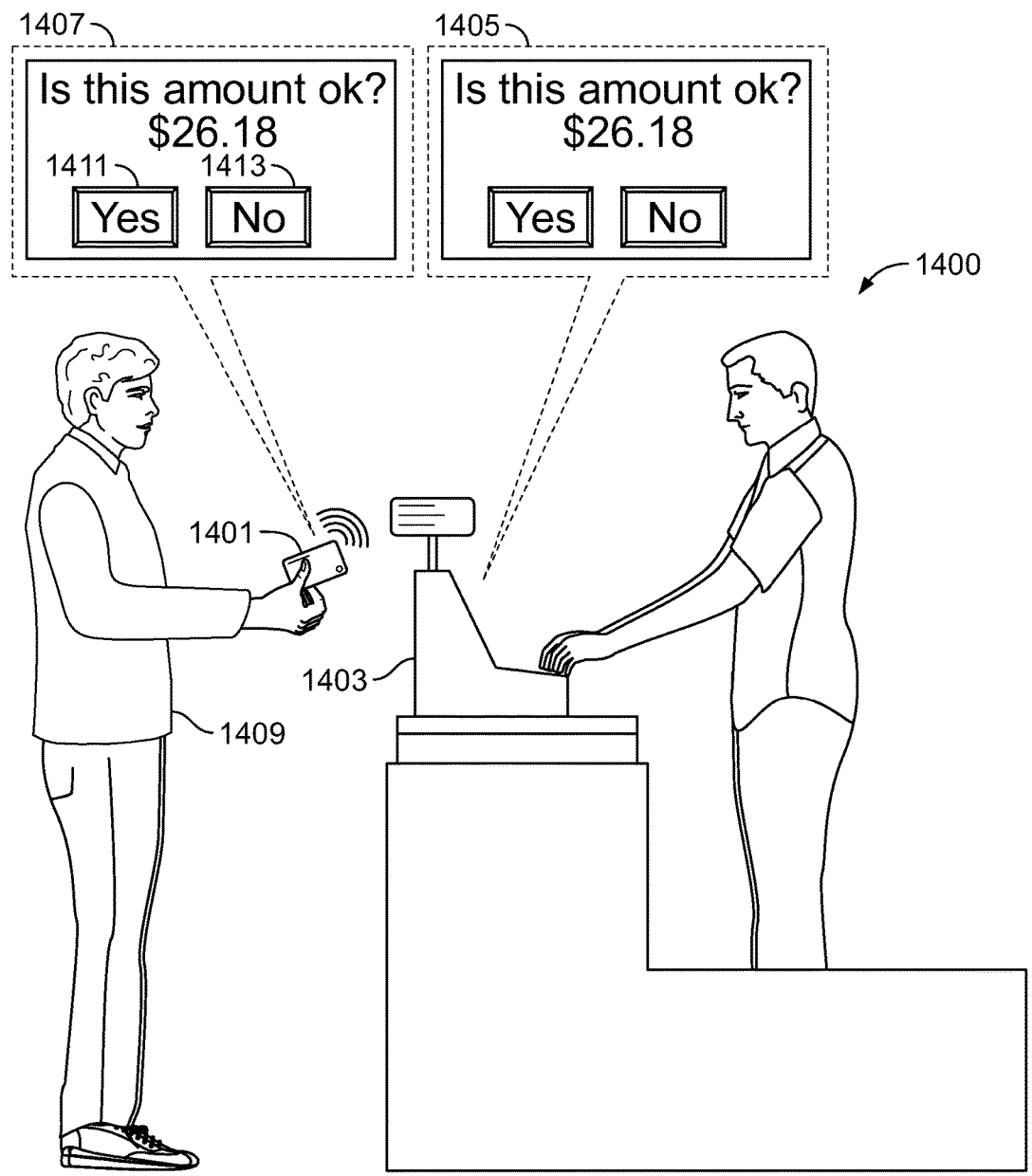
FIG. 14 shows illustrative apparatus and an illustrative scenario in accordance with principles of the invention.

FIG. 14 shows illustrative scenario 1400. Scenario 1400 shows that smart card user 1409 may use sensitive data stored on smart card 1401 to pay for purchase at POS terminal 1403. Scenario 1400 also shows that in some embodiments, information 1405 displayed at POS terminal 1403 may be mirrored on a display of smart card 1401. For example, smart card 1401 may wireless connect to a network allows access to POS terminal 1403.

User 1409 may select one of illustrative options 1411 or 1413 to complete the purchase. User 1409 may select one of illustrative options 1411 or 1413 by tapping a touch sensitive OLED display of smart card 1401. Using smart card 1401 to compete the purchase may also serve as a U2F verification.

Figure 15:
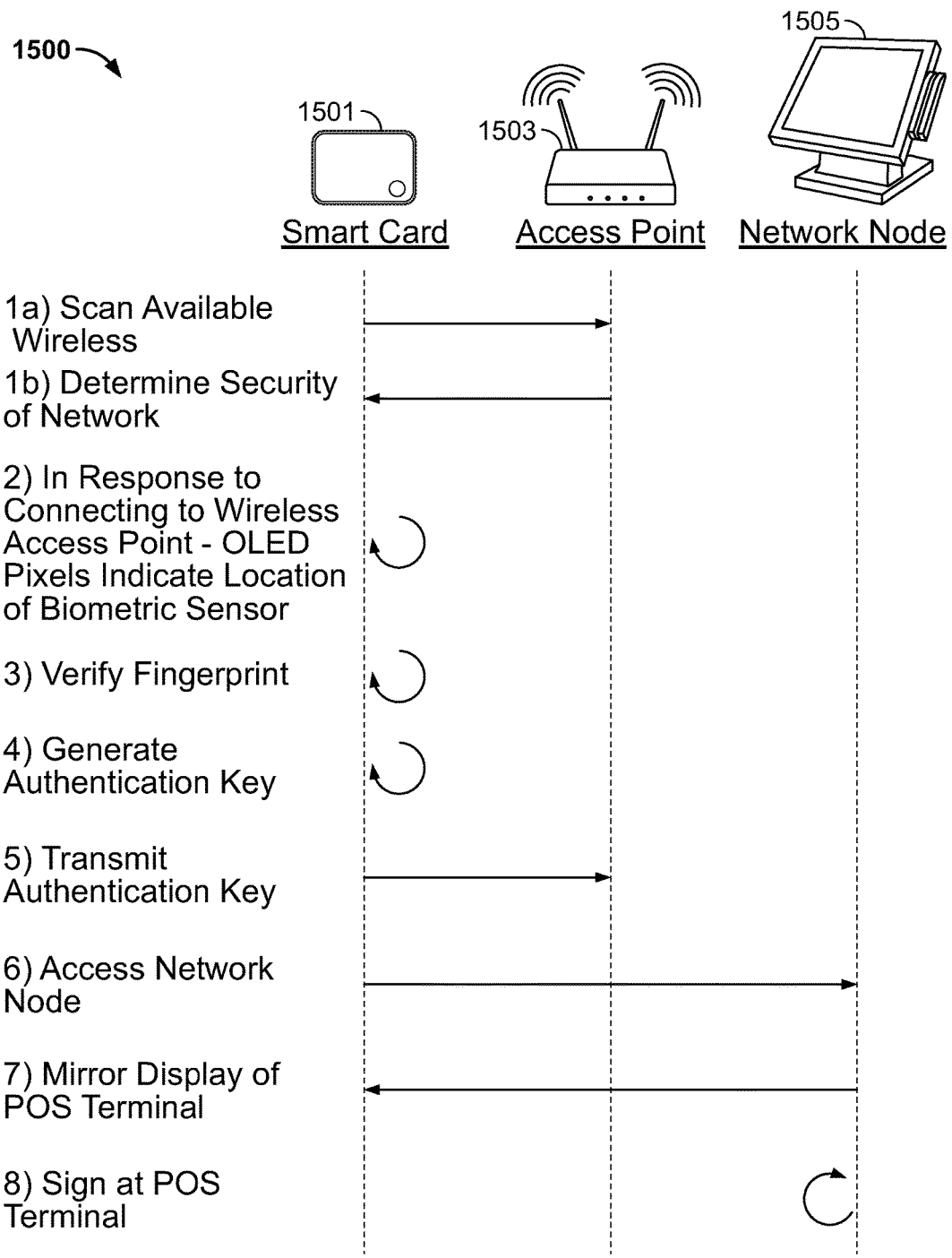
FIG. 15 shows an illustrative process in accordance with principles of the invention.

FIG. 15 shows illustrative transmission flow 1500. Transmission flow 1500 may begin with steps 1a-b. At step 1a, smart card 1501 scans for available wireless networks. At step 1b, smart card 1501 determines a level of security on any available wireless networks. Smart card 1501 may be programmed to avoid connecting to untrusted or unsecure networks.

At step 2, in response to connecting to network access point 1503, an OLED display of smart card 1501 illuminates to show a location of a biometric sensor embedded in smart card 1501. At step 3, smart card 1501 verifies a fingerprint captured by smart card 1501. In other embodiments, a captured biometric feature may include an iris scan, voice recognition or any suitable biometric feature or combination of biometric features. Smart card 1501 may include one or more biometric sensors. For example, smart card 1501 may include a camera, fingerprint reader and microphone.

At step 4, smart card 1501 generates an authentication key. The authentication key may be generated based on an electronic signature of the captured biometric feature. At step 5, smart card 1501 transmits the authentication key to access point 1503. At step 6, smart card 1501 is given access to network node 1505.

Network node 1505 may be a POS terminal. At step 7, an OLED display of smart card 1501 may mirror information presented at network node 1505. At step 8, a user of smart card 1501 may complete a purchase or other transaction by signing or otherwise acknowledgment. In some embodiments, verification of biometric feature alone may be sufficient acknowledgment.

Figure 16:
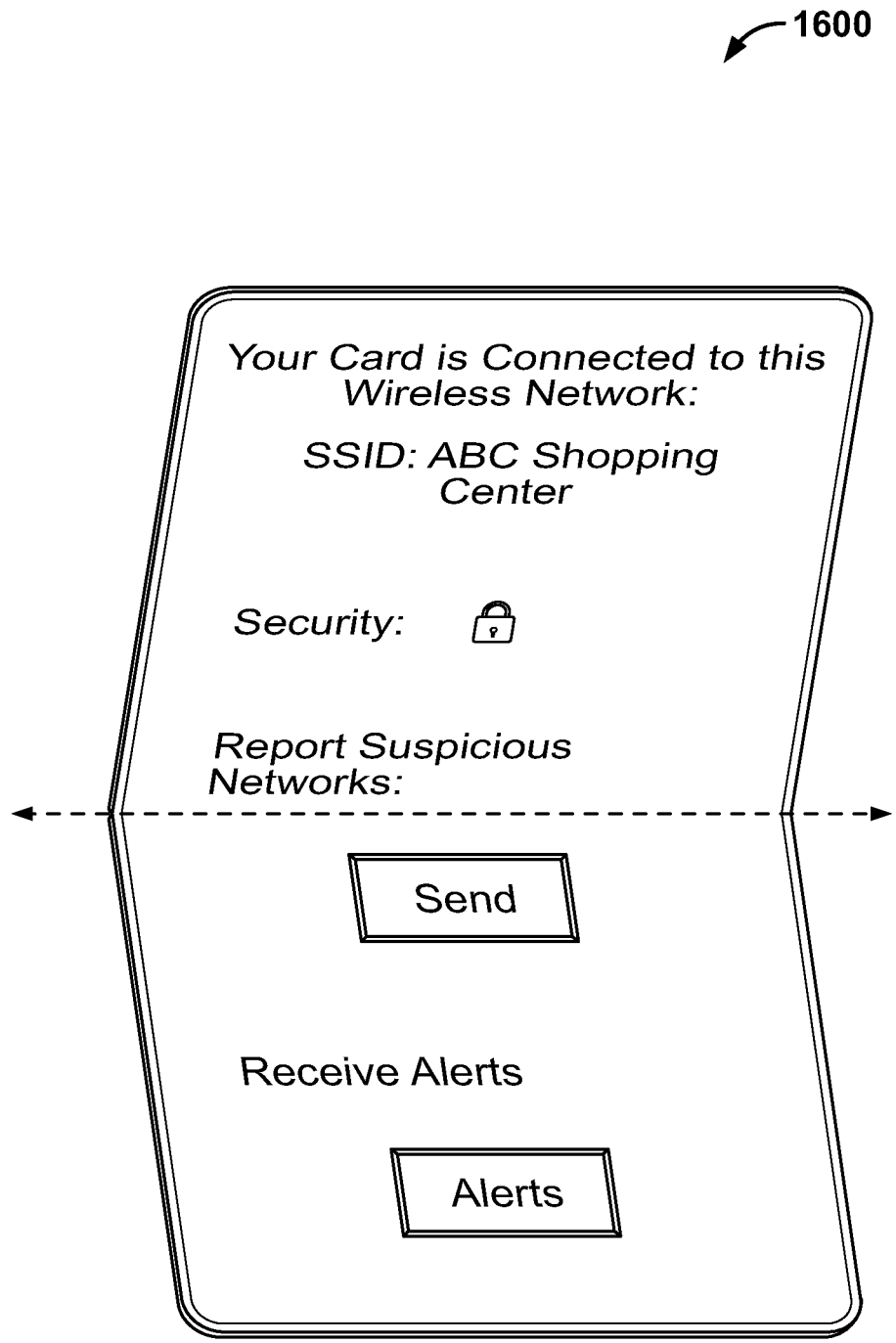
FIG. 16 shows illustrative apparatus in accordance with principles of the invention.

FIG. 16 shows illustrative smart card 1600. FIG. 16 shows that smart card 1600 includes an OLED display that may be bent or rolled. Smart card 1600, when folded may have a size that is not greater than 85.60 mm×53.98 mm×0.8 mm.

Thus, methods and apparatus for an OLED Security Authentication System have been provided. Persons skilled in the art will appreciate that the present invention can be practiced by other than the described embodiments, which are presented for purposes of illustration rather than of limitation. The present invention is limited only by the claims that follow.

What is claimed is:

1. A smart card comprising:
an array of organic light emitting diodes ("OLEDs") forming one or more pixels, the array of OLEDs having a thickness that is not greater than 0.25 mm and having a surface area that is at least 90% of 85.60 mm×53.98 mm;
a power source that is not greater than 0.8 mm thick;
a biometric sensor having a thickness that is not greater than 0.8 mm;
a wireless communication circuit having a thickness that is not greater than 0.8 mm; and
a processor circuit comprising a non-transitory memory, a processor and an electronic signature of a fingerprint stored in the non-transitory memory, the processor circuit having a thickness that is not greater than 0.25 mm;
wherein in operation, the processor circuit controls operation of the biometric sensor and the wireless communication circuit by:
instructing the wireless communication circuit to scan for a wireless network and connect to a first node on the wireless network;
in response to connecting to the first node:
instructing the one or more pixels to indicate a position of the biometric sensor; and
instructing the biometric sensor to scan for and capture an electronic signature of a fingerprint pressed against the biometric sensor;
in response to capturing the electronic signature of the fingerprint, verifying the fingerprint by confirming that the electronic signature of the fingerprint captured by the biometric sensor corresponds to the electronic signature of the fingerprint stored in the non-transitory memory;
in response to verifying the fingerprint, generating a randomly generated authentication key based on the electronic signature of the fingerprint; and
instructing the wireless communication circuit to transmit the randomly generated authentication key to the first node on the wireless network and thereby access a second node on the wireless network.

2. The smart card of claim 1 wherein, the randomly generated authentication key is Universal $2^{nd}$ Factor compliant.

3. The smart card of claim 1 wherein, the first node on the wireless network is a point-of-sale terminal.

4. The smart card of claim 1 wherein, the wireless communication circuit has a maximum transmission range of 50 cm.

5. The smart card of claim 1 wherein, the power source comprises a battery having a thickness that is not greater than 0.5 mm.

6. The smart card of claim 1 wherein, when the wireless communication circuit is in communication with the first node, the processor circuit instructs the array of OLEDs to display identification of the wireless network on a predetermined surface area of the array of OLEDs.

7. The smart card of claim 1 wherein, the first node is a mobile device.

8. A smart card comprising:
an array of organic light emitting diodes ("OLEDs") forming one or more pixels, the array of OLEDs having a thickness that is not greater than 0.25 mm and having a surface area that is at least 90% of 85.60 mm×53.98 mm; and
a pressure sensitive biometric sensor embedded in the array of OLEDs;
a wireless communication circuit having a thickness that is not greater than 0.8 mm;
a processor circuit comprising a non-transitory memory, a processor and an electronic signature of a fingerprint stored in the non-transitory memory, the processor circuit having a thickness that is not greater than 0.25 mm; and
a battery for powering the array of OLEDs, the biometric sensor, the wireless communication circuit and the processor circuit, the battery having a thickness that is not greater than 0.5 mm;

wherein in operation, the processor circuit controls operation of the biometric sensor and the wireless communication circuit by:
  in response to detecting pressure applied to the biometric sensor:
    instructing the wireless communication circuit to scan for a wireless network and connect to a first node on the wireless network; and
    instructing the biometric sensor to scan for a fingerprint;
  in response to a capturing of the fingerprint by the biometric sensor, verifying the fingerprint by confirming that an electronic signature of the fingerprint captured by the biometric sensor corresponds to the electronic signature of the fingerprint stored in the non-transitory memory;
  in response to verifying the fingerprint, generating a randomly generated authentication key;
  instructing the wireless communication circuit to transmit the randomly generated authentication key to the first node on the network and thereby obtain access to a second node on the network.

9. The smart card of claim 8 wherein the randomly generated authentication key is Universal $2^{nd}$ Factor compliant.

10. The smart card of claim 8 wherein the first node on the wireless network is a point-of-sale ("POS") terminal.

11. The smart card of claim 10 wherein, the when the wireless communication circuit is connected to the POS terminal, the processor circuit instructs the array of OLEDs to mirror information displayed on the POS terminal.

12. The smart card of claim 11 wherein when the array of OLEDs mirrors the information displayed on the POS terminal, the processor circuit is configured to process pressure applied to the pressure sensitive biometric sensor as a response to the information displayed on the POS terminal.

13. The smart card of claim 8 wherein the wireless communication circuit has a maximum range of 50 cm.

14. The smart card of claim 8 further comprising a thermoelectric generator that is not greater than 0.8 mm thick.

15. The smart card of claim 8 wherein, when the wireless communication circuit is connected to the second node, the processor circuit instructs the array of OLEDs to display an identification of the wireless network picture on a predetermined surface area of the array of OLEDs.

16. The smart card of claim 8 wherein the second node is a mobile device.

17. A smart card comprising:
  a flexible array of organic light emitting diodes ("OLEDs") forming one or more pixels, the array of OLEDs having a thickness that is not greater than 0.25 mm and having a surface area that is at least 90% of 85.60×53.98 mm;
  a pressure sensitive biometric sensor positioned below the flexible array of OLEDs;
  a wireless communication circuit having a thickness that is not greater than 0.8 mm;
  a processor circuit comprising a non-transitory memory, a processor and an electronic signature of a fingerprint stored in the non-transitory memory, the processor circuit having a thickness that is not greater than 0.25 mm; and
wherein in operation, the processor circuit controls operation of the biometric sensor and the wireless communication circuit by:
  in response to detecting pressure applied to the flexible array of OLEDs:
    instructing the wireless communication circuit to scan for a wireless network and connect to a node on the wireless network; and
    instructing the biometric sensor to scan for a fingerprint;
  in response to a capturing of the fingerprint by the biometric sensor, verifying the fingerprint by confirming that an electronic signature of the fingerprint captured by the biometric sensor corresponds to the electronic signature of the fingerprint stored in the non-transitory memory;
  in response to verifying the fingerprint, generating a randomly generated authentication key; and
  instructing the wireless communication circuit to transmit the randomly generated authentication key to the node on the network and thereby obtain access to a plurality of nodes on the wireless network.

18. The smart card of claim 17 further comprising a battery for powering the OLED layer, the biometric sensor, the wireless communication circuit and the processor circuit.

19. The smart card of claim 18 wherein the battery has a thickness that is not greater than 0.5 mm.

20. The smart card of claim 17 wherein the wireless communication circuit is powered by signals transmitted to the wireless communication circuit from the node.

* * * * *